(12) United States Patent
Komura et al.

(10) Patent No.: US 7,638,219 B2
(45) Date of Patent: Dec. 29, 2009

(54) FUEL CELL WITHOUT Z-LIKE CONNECTION PLATES AND THE METHOD PRODUCING THE SAME

(75) Inventors: Takashi Komura, Iruma-gun (JP);
Yoichi Asano, Utsunomiya (JP);
Chikara Iwasawa, Saitama (JP);
Ryoichiro Takahashi, Utsunomiya (JP);
Masaaki Sakano, Utsunomiya (JP);
Keisuke Andou, Saitama (JP); Kentaro Nagoshi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 230 days.

(21) Appl. No.: 10/795,952

(22) Filed: Mar. 8, 2004

(65) Prior Publication Data

US 2004/0175606 A1  Sep. 9, 2004

(30) Foreign Application Priority Data

Mar. 7, 2003 (JP) ............................ 2003-061976
Mar. 7, 2003 (JP) ............................ 2003-062009
Mar. 7, 2003 (JP) ............................ 2003-062047

(51) Int. Cl.
  *H01M 8/24* (2006.01)
(52) U.S. Cl. .................. 429/32; 429/12; 429/30; 429/34; 429/35; 429/38
(58) Field of Classification Search .................. 429/34
See application file for complete search history.

(56) References Cited

U.S. PATENT DOCUMENTS

| | | | |
|---|---|---|---|
| 3,525,646 A | | 8/1970 | Tannenberger et al. |
| 3,770,509 A | * | 11/1973 | Winsel et al. ............. 429/42 |
| 4,666,798 A | * | 5/1987 | Herceg ...................... 429/12 |
| 5,547,777 A | * | 8/1996 | Richards ................... 429/32 |
| 5,773,160 A | * | 6/1998 | Wilkinson et al. ......... 429/13 |
| 5,925,477 A | | 7/1999 | Ledjeff et al. |
| 5,942,348 A | * | 8/1999 | Jansing et al. ............. 429/32 |

(Continued)

FOREIGN PATENT DOCUMENTS

EP  1289042 A2 *  3/2003

(Continued)

OTHER PUBLICATIONS

Japanese Office Action for Application No. 2003-061976, dated Nov. 27, 2007.

(Continued)

*Primary Examiner*—Patrick Ryan
*Assistant Examiner*—Tony Chuo
(74) *Attorney, Agent, or Firm*—Lahive & Cockfield, LLP; Anthony A. Laurentano

(57) ABSTRACT

Anodes are provided on a porous resin film, a polymer electrolyte membrane is provided on the anodes, and cathodes are provided on the polymer electrolyte membrane to form a plurality of membrane electrode assemblies as power generation units. An electrically conductive member is connected to the cathode of a membrane electrode assembly, and a metal film is electrically connected to the anode of an adjacent membrane electrode assembly. The electrically conductive member has an expansion connected to the metal film. The cathode of the membrane electrode assembly and the anode of the adjacent membrane electrode assembly are electrically connected by the electrically conductive member and the metal film.

7 Claims, 23 Drawing Sheets

U.S. PATENT DOCUMENTS

| | | | |
|---|---|---|---|
| 6,680,139 B2 * | 1/2004 | Narayanan et al. | 429/34 |
| 2001/0044041 A1 * | 11/2001 | Badding et al. | 429/32 |
| 2002/0187382 A1 * | 12/2002 | Nishiumi et al. | 429/34 |
| 2003/0022051 A1 * | 1/2003 | Haluzak | 429/34 |
| 2003/0049518 A1 * | 3/2003 | Nanaumi et al. | 429/44 |
| 2003/0104262 A1 * | 6/2003 | Kuroki et al. | 429/36 |
| 2003/0113609 A1 * | 6/2003 | Batfalsky et al. | 429/34 |
| 2004/0028975 A1 * | 2/2004 | Badding et al. | 429/32 |
| 2004/0219412 A1 | 11/2004 | Kimura et al. | |
| 2005/0074651 A1 | 4/2005 | Kidai et al. | |

FOREIGN PATENT DOCUMENTS

| | | | |
|---|---|---|---|
| JP | 48-24702 | | 7/1973 |
| JP | 63-279578 | * | 11/1988 |
| JP | 2-101775 | | 4/1990 |
| JP | 10-513600 | | 12/1998 |
| JP | 2001-273914 | | 10/2001 |
| JP | 2002-056855 | | 2/2002 |
| JP | 2002-110215 | * | 4/2002 |
| JP | 2002-280049 | | 9/2002 |
| JP | 2003-197225 | * | 7/2003 |
| JP | 2004-14322 | | 1/2004 |
| JP | 2004-207155 | | 7/2004 |
| WO | WO-02/059996 A1 | | 8/2002 |

OTHER PUBLICATIONS

Japanese Office Action for Application No. 2003-062009, dated Nov. 27, 2007.

* cited by examiner

→ COOLANT
▨ OXYGEN-CONTAINING GAS
⇨ FUEL GAS

FUEL CELL WITHOUT Z-LIKE CONNECTION PLATES AND THE METHOD PRODUCING THE SAME

BACKGROUND OF THE INVENTION

1. Field of the Invention

The present invention relates to a fuel cell having a plurality of power generation units arranged in a same plane. Each of the power generation units includes an anode, a cathode, and an electrolyte interposed between the anode and the cathode. Further, the present invention relates to a method of producing the fuel cell, and a fuel cell stack including a plurality of the fuel cells.

2. Description of the Related Art

For example, a solid polymer electrolyte fuel cell employs a membrane electrode assembly (MEA) which includes two electrodes (anode and cathode), and an electrolyte membrane interposed between the electrodes. Each of the electrodes comprises an electrode catalyst layer of noble metal supported on a carbon base material. The electrolyte membrane is a polymer ion exchange membrane. The membrane electrode assembly is a power generation unit interposed between separators (bipolar plates). The membrane electrode assembly and the separators make up a unit of a fuel cell (unit cell) for generating electricity. A predetermined number of the fuel cells are stacked together to form a fuel cell stack.

In the fuel cell, a fuel gas (reactant gas) such as a gas chiefly containing hydrogen (hydrogen-containing gas) is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. A gas chiefly containing oxygen (oxygen-containing gas) or air is supplied to the cathode. At the cathode, the hydrogen ions from the anode combine with the electrons and oxygen to produce water.

For example, Japanese Laid-Open Patent Publication No. 2002-56855 discloses a flat fuel cell in which a plurality of unit cells are arranged in the same plane in a single row, or a plurality of rows. The unit cells are electrically connected in series.

FIG. 23 shows the flat fuel cell. The flat fuel cell includes unit cells 4a through 4d. Air electrodes (cathodes) 2a through 2d and fuel electrodes (anodes) 3a through 3d are provided on both sides of electrolyte layers 1a through 1d. The same electrodes are arranged on the same side of the electrolyte layers 1a through 1d, i.e., the cathodes 2a through 2d are arranged on one side of the electrolyte layers 1a through 1d, and the anodes 3a through 3d are arranged on the other side of the electrolyte layers 1a through 1d. Conductive Z-like connection plates 5a through 5d connect the unit cells 4a through 4d together in series.

Specifically, the conductive Z-like connection plate 5a connects the cathode 2a of the unit cell 4a and the anode 3b of the unit cell 4b, the conductive Z-like connection plate 5b connects the cathode 2b of the unit cell 4b and the anode 3c of the unit cell 4c, and the conductive Z-like connection plate 5c connects the cathode 2c of the unit cell 4c and the anode 3d of the unit cell 4d. The anode 3a of the unit cell 4a is connected to a terminal 6a, and the cathode 2d of the unit cell 3d is connected to a terminal 6b.

According to the disclosed prior art technique, the dedicated Z-like connection plates 5a through 5c are required for connecting the cathodes 2a through 2d and the anodes 3a through 3d of the unit cells 4a through 4d electrically in series. The Z-like connection plates 5a through 5c extend between the cathodes 2a through 2d and the anodes 3a through 3d, respectively. In this structure, the reliable sealing performance between the cathodes 2a through 2d and the anodes 3a through 3d may not be achieved.

Moreover, the thickness of the fuel cell in the direction indicated by an arrow T is large. Thus, the overall size of the fuel cell is not small.

Further, the thickness of the fuel cell indicated by an arrow T is large. Thus, the overall size of the fuel cell is not small. Further, the unit cells 4a through 4d are separate components. Therefore, the unit cells 4a through 4d may not be positioned accurately in alignment with each other.

If the fuel cell stack is mounted on a vehicle, two hundreds to six hundreds of unit cells are required to form the fuel cell stack for generating the desired level of voltage and current for driving the vehicle. In the disclosed prior art technique, preferably, a plurality of the flat fuel cells may be connected in series for generating a high level of voltage.

When the fuel cells are stacked together for generating a large electrical energy at a high voltage, the excessive heat generation of the fuel cells may affect the performance of the fuel cell stack. Therefore, it is essential to use a liquid cooling system for effectively cooling the fuel cells. However, Japanese Laid-Open Patent Publication No. 2002-56855 merely discloses a fuel cell operated at a small voltage. No solutions using such a cooling system are suggested in the disclosure.

SUMMARY OF THE INVENTION

A general object of the present invention is to provide a fuel cell having a simple and compact structure and a method of producing the fuel cell in which a plurality of power generation units are electrically connected in series for achieving a desired level of voltage, and the power generation units are sealed desirably.

A main object of the present invention is to provide a fuel cell stack having a simple and compact structure in which a plurality of power generation units are arranged in a same plane to form a fuel cell, and a plurality of the fuel cells are stacked to produce a large output (a large amount of electricity).

According to the present invention, a plurality of power generation units including a pair of adjacent power generation units are arranged on a porous insulating film. Each of the power generation units includes a first electrode facing the porous insulating film and a second electrode, and an electrolyte interposed between the first electrode and the second electrode.

A first electrically conductive film is electrically connected to the first electrode of one of the adjacent power generation units, and a second electrically conductive film is electrically connected to the second electrode of the other of the adjacent power generation units. The first electrically conductive film or the second electrically conductive film has an expansion between the adjacent power generation units for connecting the first electrically conductive film and the second electrically conductive film.

In the adjacent power generation units, the first electrode of one of the adjacent power generation units is connected to the second electrode of the other of the adjacent power generation units by the first and second electrically conductive films. The power generation units of the fuel cell are connected in series using the connection structure.

Specifically, assuming that a first power generation unit is disposed adjacent to a second power generation unit, the first electrically conductive film is electrically connected to the first electrode of the first power generation unit, and the second electrically conductive film is electrically connected to the second electrode of the second power generation unit. The first electrically conductive film and the second electrically conductive film are electrically connected with each other. Thus, the first power generation unit and the second power generation unit are electrically connected with each other.

Likewise, the first electrically conductive film connected to the first electrode of the second power generation unit is connected to the second electrically conductive film connected to the second electrode of a third power generation unit which is disposed adjacent to the second power generation unit. Thus, the second power generation unit is electrically connected to the third power generation unit. In this manner, the first through third power generation units are electrically connected in series. Unlike the conventional structure, no dedicated Z-like connection plates are required for electrical connection. The fuel cell is produced at a low cost, and the reliable sealing performance can be achieved. The overall size of the fuel cell is small, and the overall structure of the fuel cell is simple.

Preferably, the first electrically conductive film is arranged in a substantially same plane with a gas diffusion layer of the first electrode, and the second electrically conductive film is arranged in a substantially same plane with a gas diffusion layer of the second electrode to reduce the thickness of the fuel cell, and to reduce the overall size of the fuel cell.

Preferably, the first electrically conductive film is made of metal, and the second electrically conductive film is made of composite material of resin and electrically conductive material. It is also preferable that the first electrically conductive film is made of composite material of resin and electrically conductive material, and the second electrically conductive film is made of metal. The metal film can be handled easily, and the film of composite material does not require positioning accuracy. Thus, the production of the fuel cell can be carried out simply and easily, and the fuel cell has the simple and compact structure. The first electrode and the second electrode can be positioned upside down such that the second electrode faces the porous insulating film. Therefore, the structure of the fuel cell can be changed flexibly depending on the application.

According to another aspect of the present invention, in the adjacent first and second power generation units, the first electrically conductive gas diffusion layer of the first electrode of the first power generation unit has a first end protruding toward the second power generation unit, and the second electrically conductive gas diffusion layer of the second electrode of the second power generation unit has a second end protruding toward the first power generation unit. The first end and the second end are electrically connected with each other by an electrically conductive member extending through at least the electrolyte. When a reinforcing film is attached to the electrolyte, the electrically conductive member extends through the reinforcing film and the electrolyte for electrically connecting the first end and the second end.

The cathode of the first power generation unit and the anode of the adjacent second power generation unit are electrically connected with each other through the first and second electrically conductive gas diffusion layers and the electrically conductive member. In this manner, the power generation units are connected in series.

The first end of the first electrically conductive gas diffusion layer of the cathode of the second power generation unit is positioned close to the second end of the second electrically conductive gas diffusion layer of the anode of the adjacent third power generation unit. The first and second ends are positioned on both sides of the electrolyte, and the first and second ends are electrically connected with each other by the electrically conductive member extending through the electrolyte. Thus, the second power generation unit is electrically connected to the third power generation unit. In this manner, the first through third power generation units are electrically connected in series.

Electrical connection between the power generation units is simply performed by the electrically conductive member which connects the first end of the first electrically conductive gas diffusion layer and the second end of the second electrically conductive gas diffusion layer. Unlike the conventional structure, no dedicated Z-like connection plates are required for electrical connection. The fuel cell is produced at a low cost, and the reliable sealing performance can be achieved. The overall size of the fuel cell is small, and the overall structure of the fuel cell is simple.

Preferably, the first and second ends have overlapping portions, and at least the electrolyte is interposed between the overlapping portions. The overlapping portions are connected together by the electrically conductive member. Preferably, the electrically conductive member is an electrically conductive rivet member having a simple structure.

According to an aspect of the present invention, the electrolyte is an electrolyte membrane, and the power generation units are arranged in a same plane to form an MEA unit. The fuel cell further comprises first and second electrically insulating separators for sandwiching the MEA unit. A fuel gas flow field facing the power generation units is provided on the first electrically insulating separator, and an oxygen-containing gas flow field facing the power generation units is provided on the second electrically insulating separator. With the structure, the overall size of the fuel cell is small, and the fuel cell is produced at a low cost.

According to a method of producing a fuel cell of the present invention, a first electrically conductive film is attached on a porous electrically conductive film. Then, a first electrode (e.g., an anode) of the first power generation unit and a first electrode of the second power generation unit are provided on the first electrically conductive film. The first electrode of the second power generation unit is electrically connected to the first electrically conductive film.

Next, a first electrolyte is provided on the first electrode of the first power generation unit and a second electrolyte is provided on the first electrode the second power generation unit such that the first and second electrolytes are partially overlapped on the first electrically conductive film. Then, a second electrode (e.g., a cathode) of the first power generation unit and a second electrode of the second power generation unit are provided on the first and second electrolytes, respectively.

The second electrode of the first power generation unit is electrically connected to the first electrically conductive film through the second electrically conductive film. A resin insulator is provided on the second electrically conductive film, and in a gap between the second electrically conductive film and the second electrode. Components of the fuel cells are formed successively on the porous resin film. Thus, the production of the fuel cell is carried out simply. The porous resin film is used as a base surface for producing the fuel cell. Therefore, the power generation units are positioned accurately. Since the interfaces over the base surface are sealed, it is not required to provide seals which extend through the fuel cell in the stacking direction. The desired sealing performance can be achieved reliably.

Preferably, a gas diffusion layer of the first electrode of the second power generation unit and the first electrically conductive film are connected electrically and a gas diffusion layer of the second electrode of the first power generation unit and the second electrically conductive film are connected electrically. With the compact structure, the second electrode of the first power generation unit and the first electrode of the second power generation unit are connected electrically.

According to an aspect of the present invention, a plurality of power generation units are arranged in a same plane, and the power generation units are sandwiched between a pair of electrically insulating separators to form a fuel cell. Each of the power generation unit includes a first electrode a second electrode, and an electrolyte interposed between the first electrode and the second electrode. A plurality of the fuel cells are disposed in a casing. A plurality of guide grooves are formed on at least one of the separators on a surface opposite to a surface facing the power generation units, for supplying a coolant along the separator. A coolant flow field is connected to the guide grooves of each of the fuel cells in the casing.

Electrically insulating separators are used instead of metal separators. Therefore, the separators can be produced easily at a low cost. The electrically insulating separator has the guide grooves as passage of the coolant. The guide grooves are electrically insulated desirably. Since the guide grooves are insulated, leakage of electricity to the liquid or the ground is reliably prevented. Consequently, special coolant for the fuel cell or dedicated devices for preventing the leakage of electricity to the liquid such as an ion exchanger are not required. The cooling system is simple, and produced or operated at a low cost. No periodical maintenance operations are required.

It is not required to use alcohol or like which does not freeze easily. The oxidation of the solid polymer electrolyte membrane is prevented, and elusion of ions form system components can be prevented without any special devices.

The guide grooves are formed along the surface of the second separator to increase the surface area of the second separator, and thus, to improve the cooling efficiency. When the electrically insulating separators of the adjacent fuel cells are in contact with each other, the guide grooves are formed between the electrically insulating separators. Thus, when an impact such as vibration is applied to the casing, since the separators are in contact with each other, the separators do not rattle, and the fuel cells are not damaged easily by the impact.

It is not necessary to provide dedicated cooling structure in each of the fuel cells, and it is not necessary to place each of the fuel cells in a dedicated container. The number of components of the fuel cell stack is small. Therefore, the fuel cell is simple, and small. The fuel cells can be replaced individually, and handled with ease.

Preferably, a reactant gas supply passage and a reactant gas discharge passage extend through the fuel cells in a stacking direction of the fuel cells, and the fuel cell stack further comprises a seal member for separating the reactant gas supply passage and the reactant gas discharge passage from the coolant passage. With the simple structure, leakage of the reactant gases and the coolant is prevented reliably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
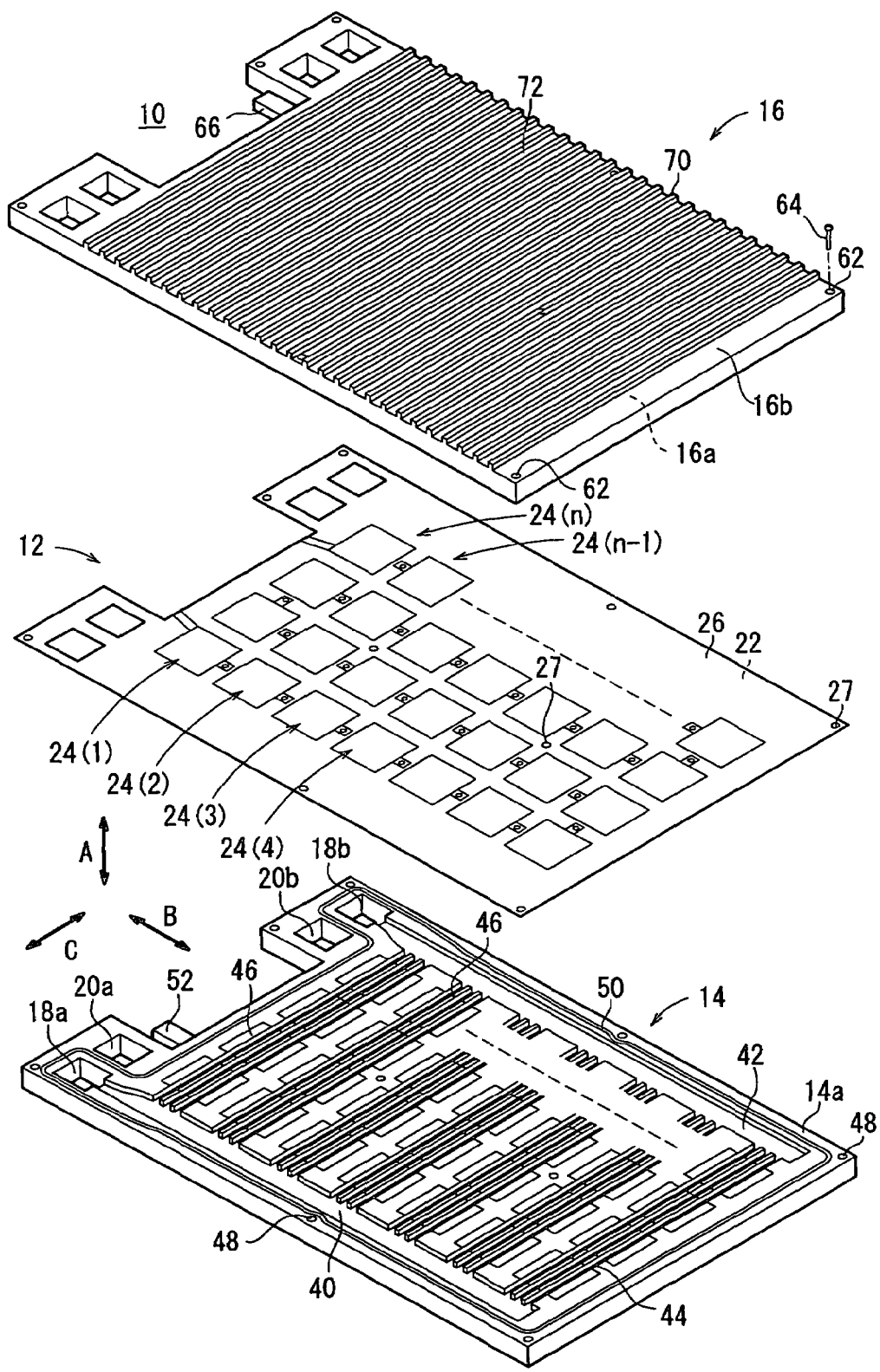
FIG. 1 is an exploded perspective view showing main components of a fuel cell according to a first embodiment of the present invention.
Figure 2:
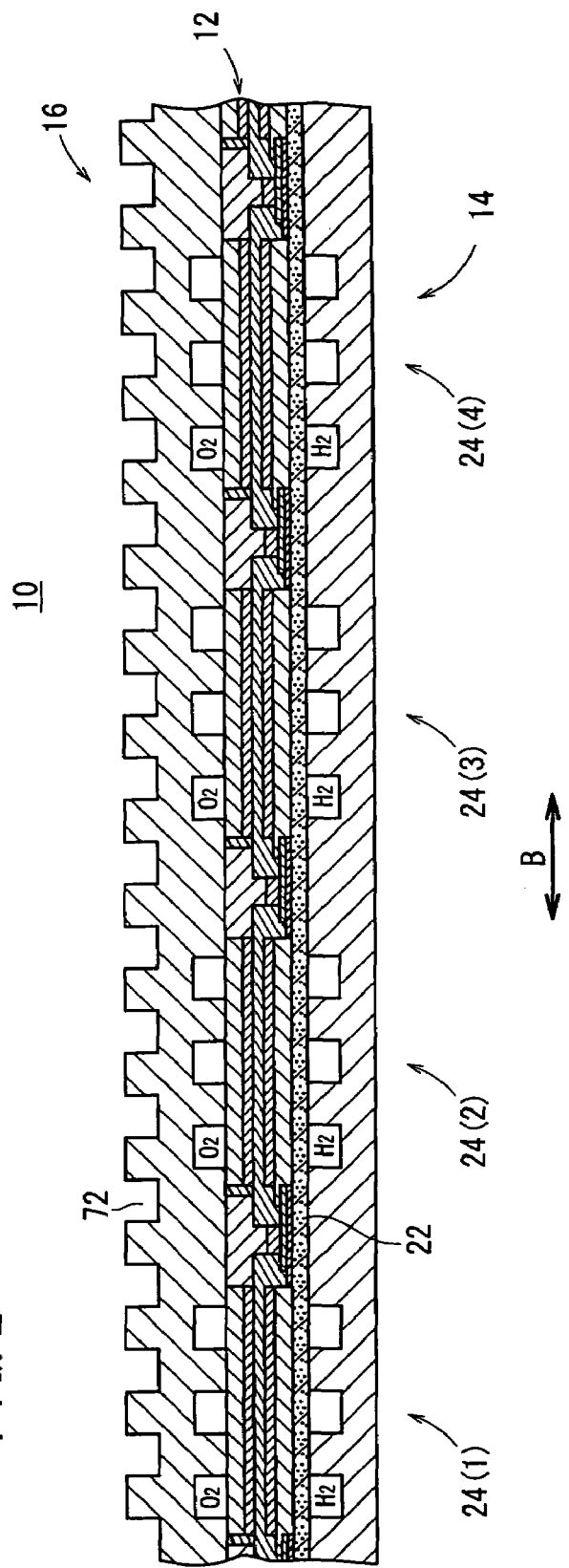
FIG. 2 is a cross sectional view showing main components of the fuel cell.

FIG. 1 is an exploded perspective view showing main components of a fuel cell 10 according to a first embodiment of the present invention. FIG. 2 is a cross sectional view showing main components of the fuel cell 10. The fuel cell 10 includes an MEA (membrane electrode assembly) unit 12, and first and second separators 14, 16 provided on both surfaces of the MEA unit 12.

At a corner of the fuel cell 10 in directions indicated by arrows B and C, a fuel gas supply passage 18a for supplying a fuel gas such as a hydrogen-containing gas, and an oxygen-containing gas supply passage 20a for supplying an oxygen-containing gas are formed adjacent to each other. The fuel gas supply passage 18a and the oxygen-containing gas supply passage 20a extend through the fuel cell 10 in a direction indicated by an arrow A. Further, at another corner of the fuel cell 10 in the directions indicated by the arrows B and C, a fuel gas discharge passage 18b for discharging the fuel gas, and an oxygen-containing gas discharge passage 20b for discharging the oxygen-containing gas are formed adjacent to each other. The fuel gas discharge passage 18b and the oxygen-containing gas discharge passage 20b extend through the fuel cell 10 in the direction indicated by the arrow A.

The MEA unit 12 includes a porous resin film (porous insulating film) 22. A predetermined number of membrane electrode assemblies (power generation units) 24(1) through 24(n) are arranged in the plane of the porous resin film 22.

Figure 3:
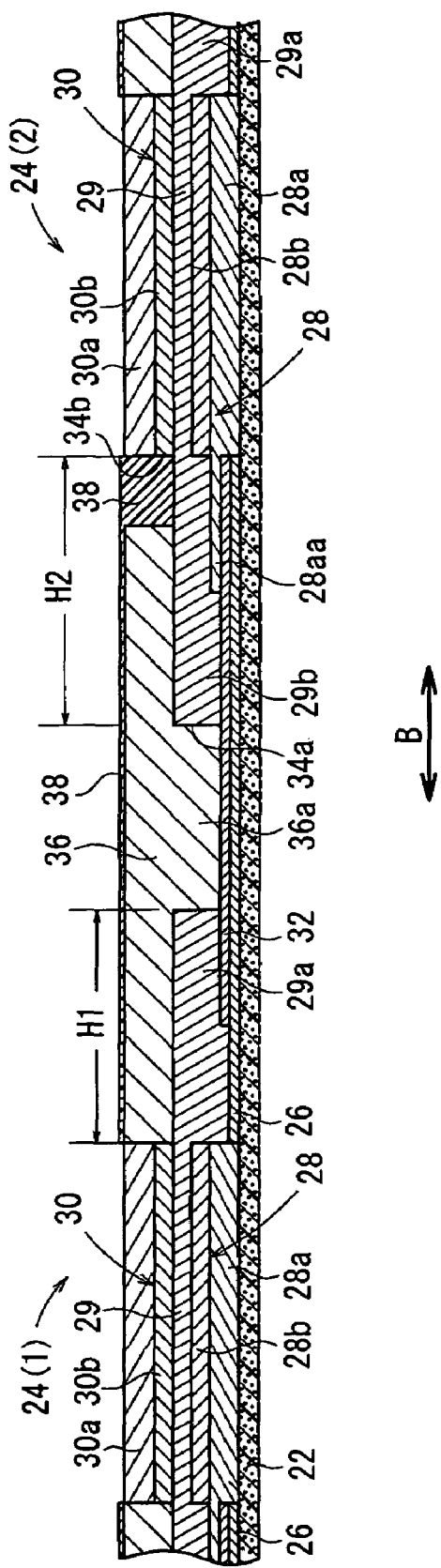
FIG. 3 is a view showing connection state in an MEA unit of the fuel cell.

As shown in FIG. 3, a film such as a silicon film 26 is laminated on the porous resin film 22. The silicon film 26 is like a window frame having windows at positions corresponding to the electrodes of the MEA unit 12 as described later. The porous resin film 22 has a plurality of holes 27 at predetermined positions (see FIG. 1).

Figure 4:
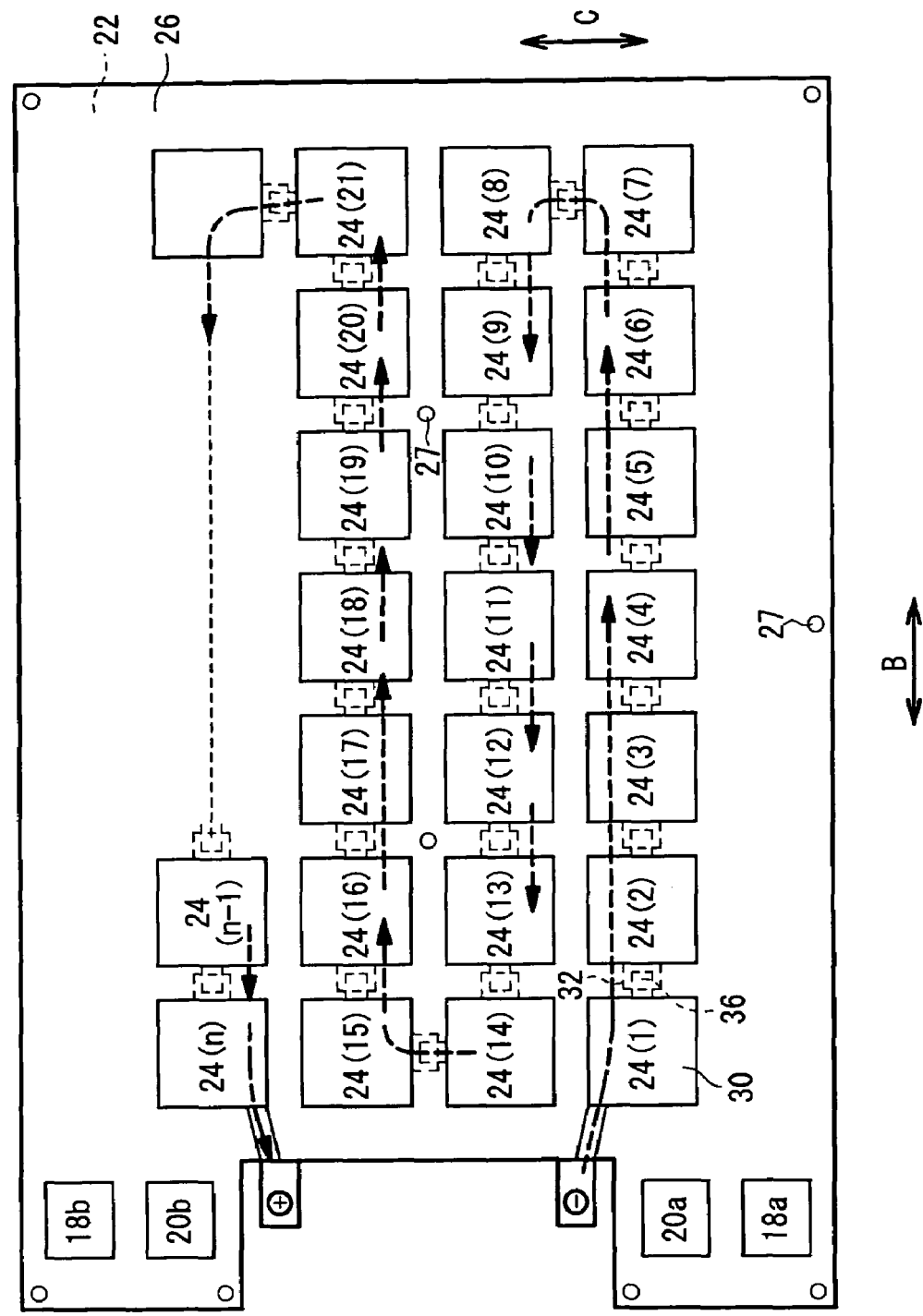
FIG. 4 is a front view showing the MEA unit.

As shown in FIGS. 3 and 4, the membrane electrode assembly 24(1) includes an anode (first electrode) 28, a cathode (second electrode) 30, and a polymer electrolyte membrane 29 interposed between the anode 28 and the cathode 30. The anode 28 includes an electrically conductive anode diffusion layer 28a and an anode catalyst layer 28b. The cathode 30 includes an electrically conductive cathode diffusion layer 30a and a cathode catalyst layer 30b.

An end 29a of the polymer electrolyte membrane 29 protrudes toward the membrane electrode assembly 24(2) positioned next to the membrane electrode assembly 24(1). The end 29a is stacked on one end of a metal film (first electrically conductive film) 32, and the metal film 32 is laminated on the silicon film 26 on the porous resin film 22.

The other end of the metal film 32 is positioned adjacent to the anode 28 of the membrane electrode assembly 24(2). An end 28aa of the anode diffusion layer 28a of the anode 28 protrudes toward the membrane electrode assembly 24(1). The end 28aa is stacked on the other end the metal film 32. An end 29b of the polymer electrolyte membrane 29 of the membrane electrode assembly 24(2) protrudes toward the membrane electrode assembly 24(1), and the end 29b covers the end 28aa of the anode diffusion layer 28a, and a predetermined area of the metal film 32. A circular gap 34a is formed between the ends 29a, 29b of the pair of the adjacent polymer electrolyte membranes 29.

An end of an electrically conductive member (second electrically conductive film) 36 is electrically connected to the cathode diffusion layer 30a of the cathode 30 of the membrane electrode assembly 24(1). The electrically conductive member 36 is made of composite material of resin and electrically conductive material, e.g., carbon. The electrically conductive member 36 is disposed between the membrane electrode assemblies 24(1), 24(2). A gap 34b is formed between the electrically conductive member 36 and the cathode 30 of the membrane electrode assembly (24)2. The electrically conductive member 36 includes a columnar expansion 36a protruding toward the gap 34a between the ends 29a, 29b of the polymer electrolyte membranes 29.

The expansion 36a is electrically connected to the metal film 32. Thus, the cathode 30 of the membrane electrode assembly 24(1) and the anode 28 of the membrane electrode assembly 24(2) are electrically connected with each other. A resin insulator 38 covers the electrically conductive member 36, and seals the gap 24b between the electrically conductive member 36 and the cathode 30 of the membrane electrode assembly 24(2).

Figure 5:
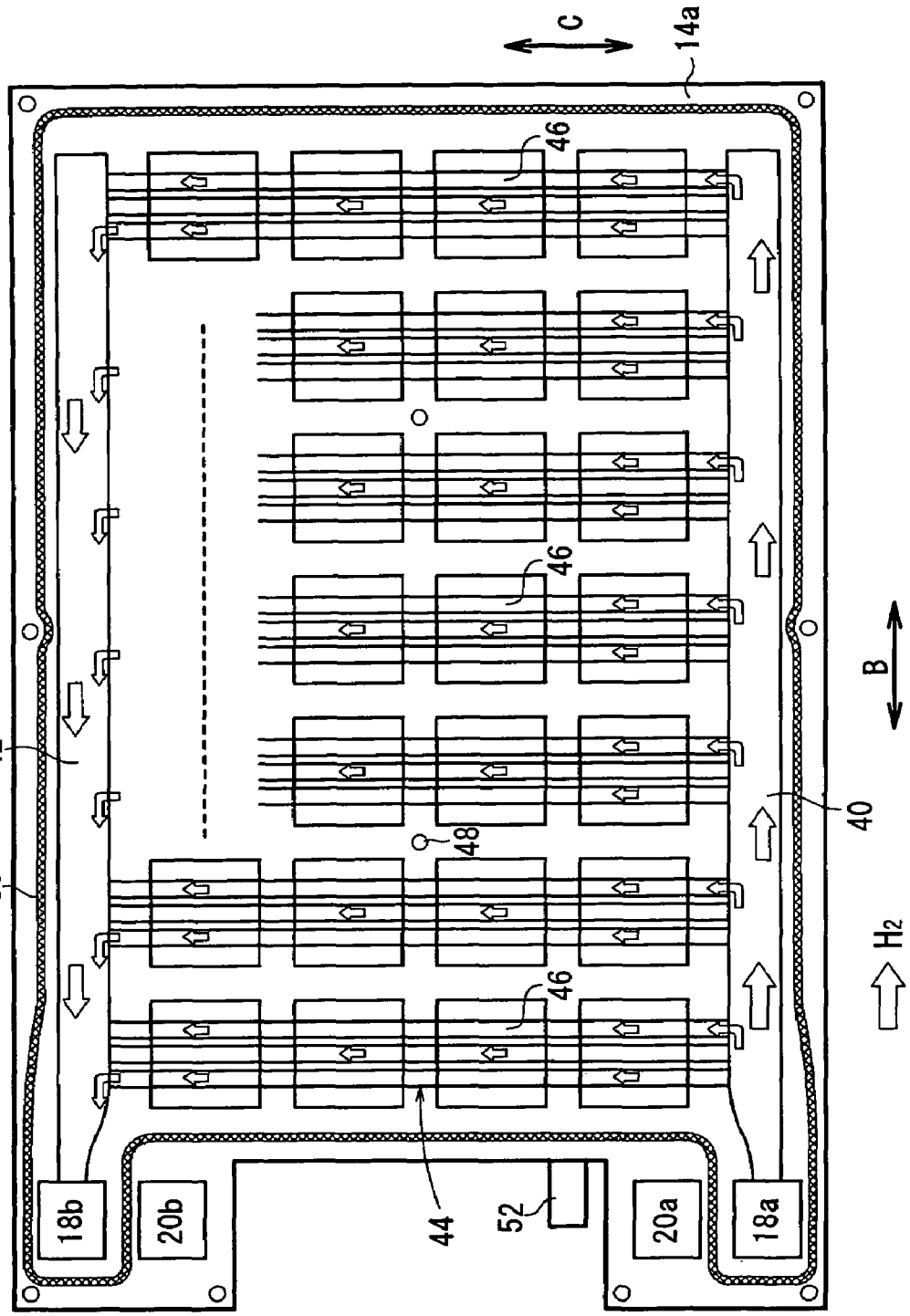
FIG. 5 is a front view showing a first separator of the fuel cell.

The first and second separators 14, 16 are made of insulating, and thermally conductive material such as reinforced plastic. As shown in FIGS. 1 and 5, the first separator 14 has a supply manifold 40 and a discharge manifold 42 on its surface 14a facing the MEA unit 12. The supply manifold 40 is formed on one side in the direction indicated by the arrow C, and the discharge manifold 42 is formed on the other side in the direction indicated by the arrow C. The supply manifold 40 and the discharge manifold 42 extend in the direction indicated by the arrow B. The supply manifold 40 includes a groove connected to the fuel gas supply passage 18a. The discharge manifold 42 includes a groove connected to the fuel gas discharge passage 18b. A fuel gas flow field 44 is formed between the supply manifold 40 and the discharge manifold 42 for supplying the fuel gas to the anodes 28 of the MEA unit 12. The fuel gas flow field 44 includes a plurality of flow grooves extending in the direction indicated by the arrow C between the supply manifold 40 and the discharge manifold 42. Rectangular recesses 46 for providing the anodes 28 of the membrane electrode assemblies 24(1) through 24(n) are formed on the surface 14a. Further, a plurality of threaded holes 48 are formed at predetermined positions on the surface 14a.

A seal 50 is formed around the fuel gas supply passage 18a, the fuel gas discharge passage 18b, the supply manifold 40, the discharge manifold 42, and the fuel gas flow field 44 by heat treatment, for example. The first separator 14 has a negative terminal 52 which is connectable to the anode 28 of the membrane electrode assembly 24(1).

Figure 6:
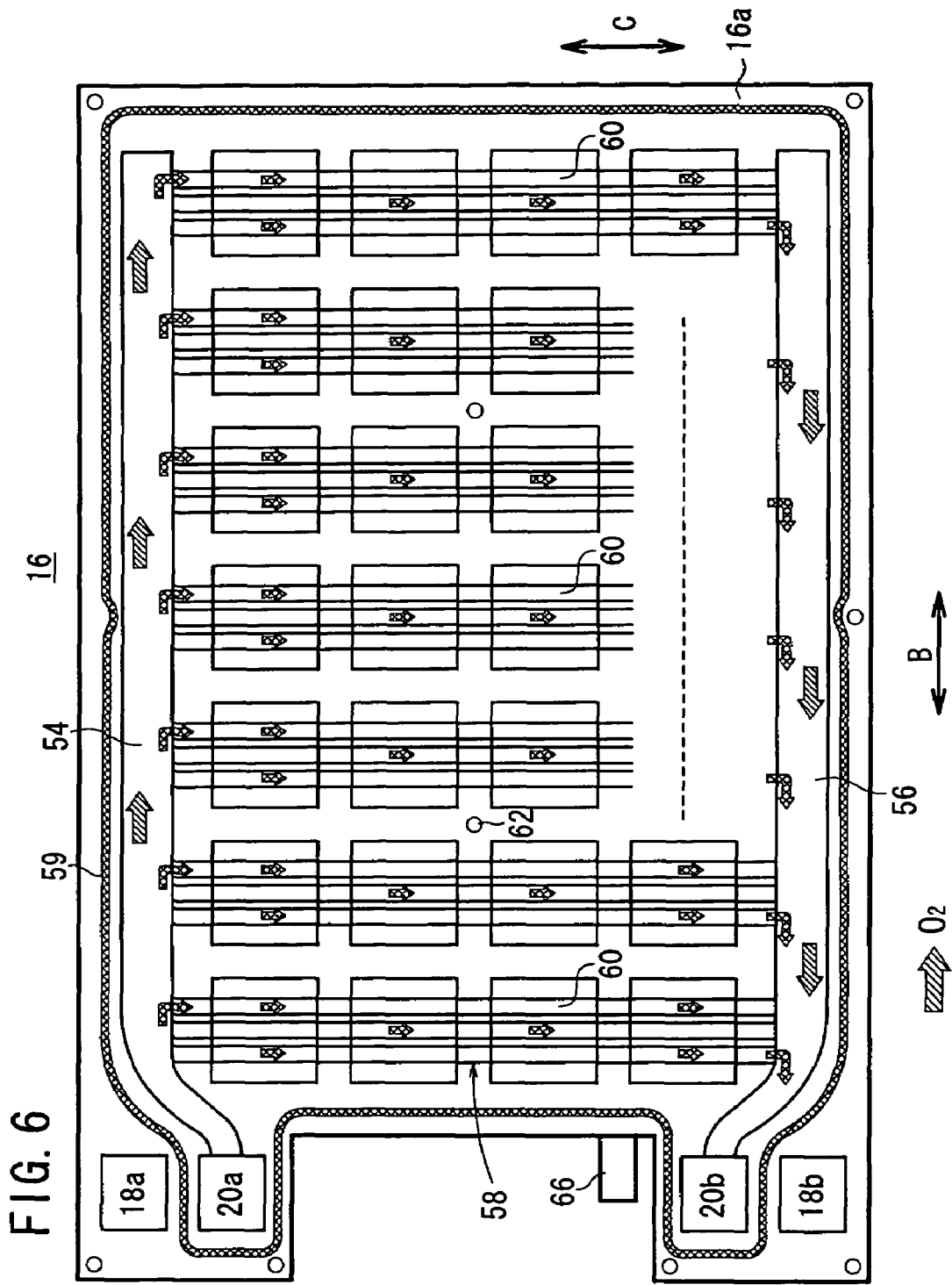
FIG. 6 is a front view showing a second separator of the fuel cell.

As shown in FIG. 6, the second separator 16 has a supply manifold 54 and a discharge manifold 56 on its surface 16a facing the MEA unit 12. The supply manifold 54 is connected to the oxygen-containing gas supply passage 20a, and extends in the direction indicated by the arrow B. The discharge manifold 56 is connected to the oxygen-containing gas discharge passage 20b, and extends in the direction indicated by the arrow B. The supply manifold 54 and the discharge manifold 56 are connected by an oxygen-containing gas flow field 58. The oxygen-containing gas flow field 58 includes a plurality of flow grooves extending in the direction indicated by the arrow C.

A seal 50 is formed around the oxygen-containing gas supply passage 20a, the oxygen-containing gas discharge passage 20b, the supply manifold 54, the discharge manifold 56, and the oxygen-containing gas flow field 58 by heat treatment, for example.

Rectangular recesses 60 corresponding to the cathodes 30 of the membrane electrode assemblies 24(1) through 24(n) are formed on the surface 16a. Holes 62 are formed at predetermined positions on the surface 16a. As shown in FIG. 1, tightening screws 64 are inserted through the holes 62, and the holes 27 of the MEA unit 12, and screwed into the threaded holes 48 of the first separator 14 for tightening the components of the fuel cell 10 together. The second separator 16 has a positive terminal 66 which is connectable to the cathode 30 of the membrane electrode assembly 24(n). The second separator 16 has ribs 70 extending in the direction indicated by the arrow C on its surface 16b opposite to the surface 16a. A coolant flow field is formed on the surface 16b by guide grooves 72 defined between the ribs 70.

Next, operation of producing the fuel cell 10 will be described. In particular, operation of producing a pair of the adjacent membrane electrode assemblies 24(1), 24(2) will be described in detail. Operation of producing the other membrane electrode assemblies 24(3) through 24(n) will not be described.

Firstly, the porous resin film 22 as a base plane of the entire MEA unit 12 is produced. Next, the silicon film 26 having windows corresponding to the membrane electrode assemblies 24(1) through 24(n) are laminated on the porous resin film 22.

Figure 7:
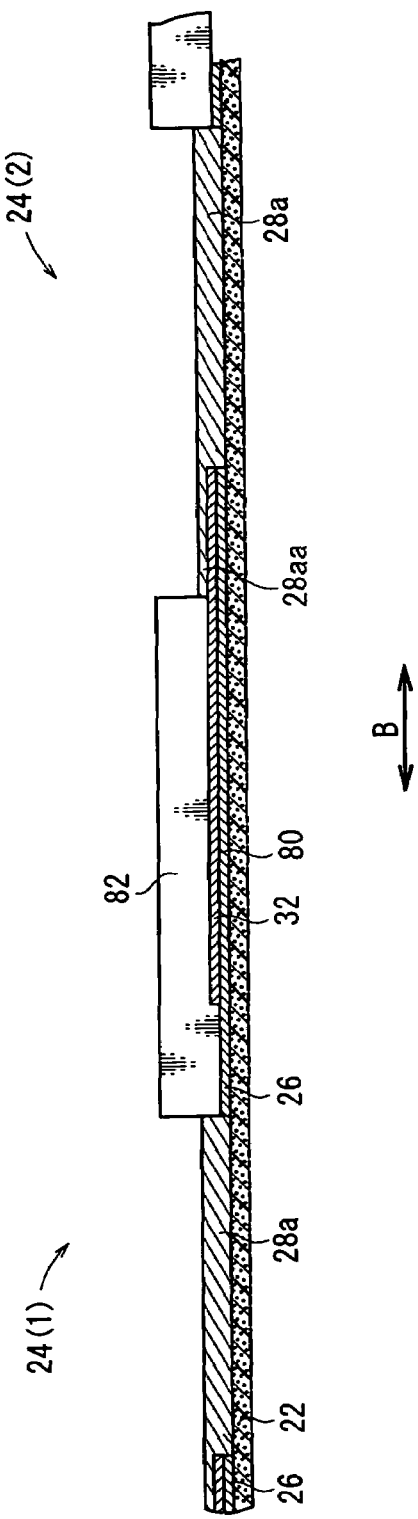
FIG. 7 is a view showing an anode diffusion layer formed on a porous resin film of the fuel cell.

Then, as shown in FIG. 7, adhesive 80 is applied to the silicon film 26 on the porous resin film 22. The adhesive 80 is used for attaching the metal film 32 to the silicon film 26. The anode diffusion layer 28a of, e.g., carbon and resin is formed on the porous resin film 22 using a masking member 82. Then, the anode diffusion layer 28a is dried. The end 28aa of the anode diffusion layer 28a of the membrane electrode assembly 24(2) is stacked on the metal film 32, and thus, electrically connected to the metal film 32.

Figure 8:
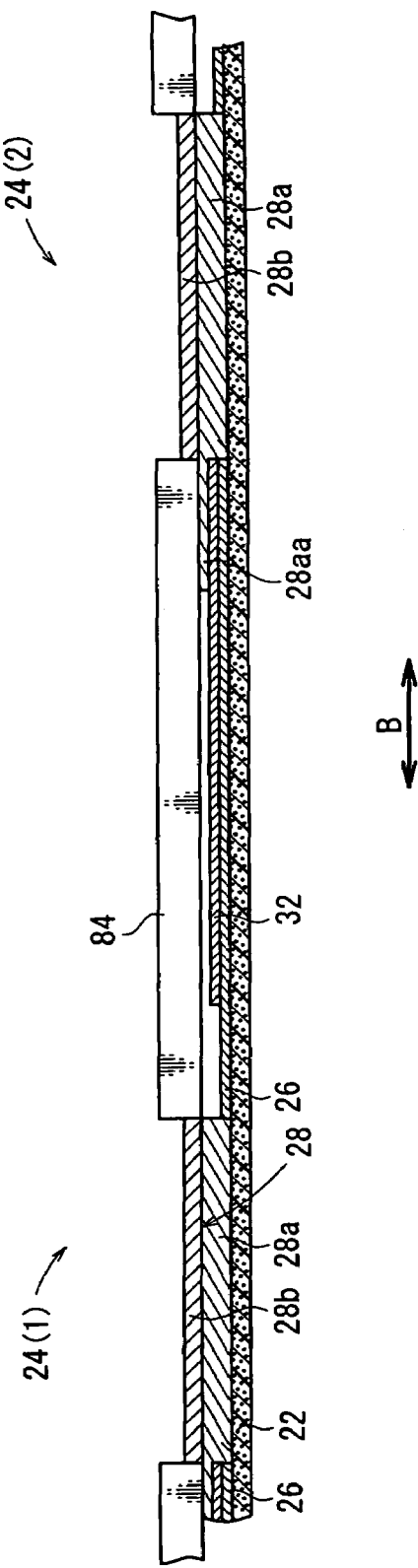
FIG. 8 is a view showing an anode catalyst layer formed on the anode diffusion layer of the fuel cell.

Next, as shown in FIG. 8, a masking member 84 is placed on the metal film 32. The anode catalyst layer 28b is formed on the anode diffusion layer 28a using the masking member 84. Then, the anode catalyst layer 28b is dried.

Figure 9:
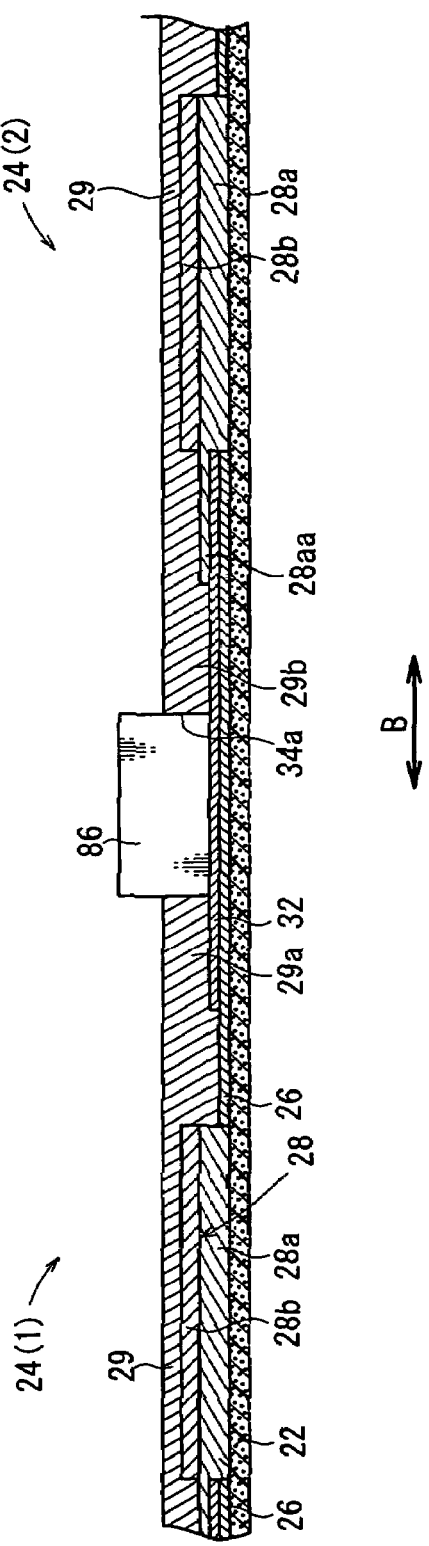
FIG. 9 is a view showing a process of forming a polymer electrolyte membrane of the fuel cell.

Thereafter, as shown in FIG. 9, the polymer electrolyte membrane 29 is formed by coating using the masking member (e.g., screen) 86. Specifically, in the membrane electrode assembly 24(1), the masking member 86 is disposed at a position for forming the gap 34a, and the end 29a of the polymer electrolyte membrane 29 on the anode electrolyte layer 28b extends over one end of the metal film 32. In the membrane electrode assembly 24(2), the end 29b of the polymer electrolyte membrane 29 extends from the electrolyte catalyst layer 28b over other end of the metal film 32. Thus, the circular gap 34a is formed by the masking member 86 between the ends 29a, 29b.

Figure 10:
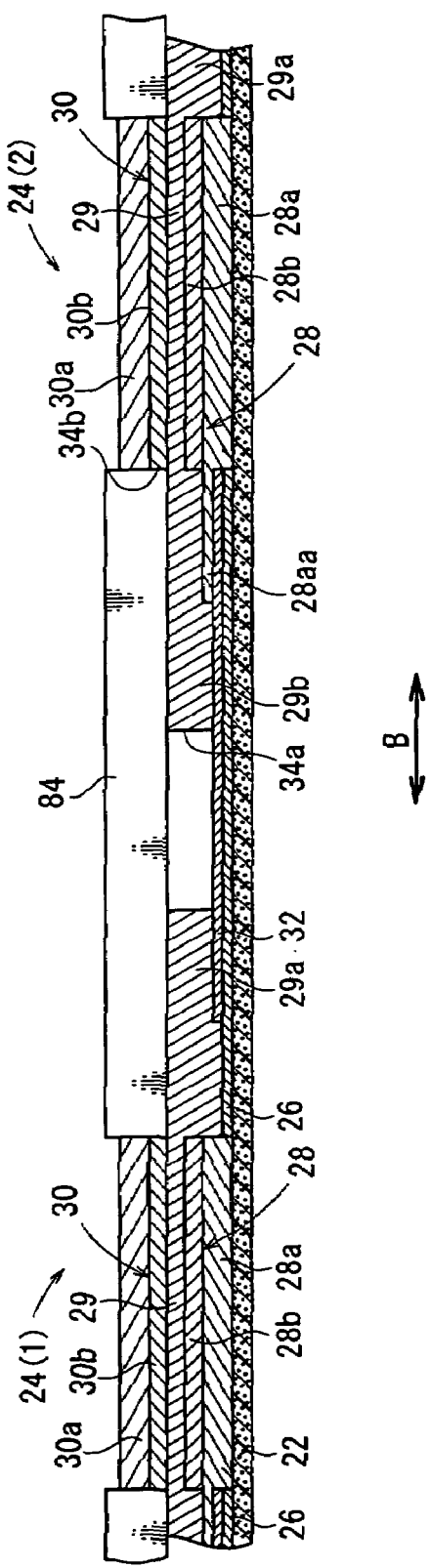
FIG. 10 is a view showing a process of forming a cathode electrolyte layer and a cathode diffusion layer of the fuel cell.

After the polymer electrolyte membrane 29 is dried, as shown in FIG. 10, the cathode catalyst layer 30b is formed on the polymer electrolyte membrane 29 using the masking member 84. After the cathode catalyst layer 30b is dried, the cathode diffusion layer (e.g., carbon and resin) 30a is formed on the cathode catalyst layer 30b. Then, the cathode diffusion layer 30a is dried.

Figure 11:
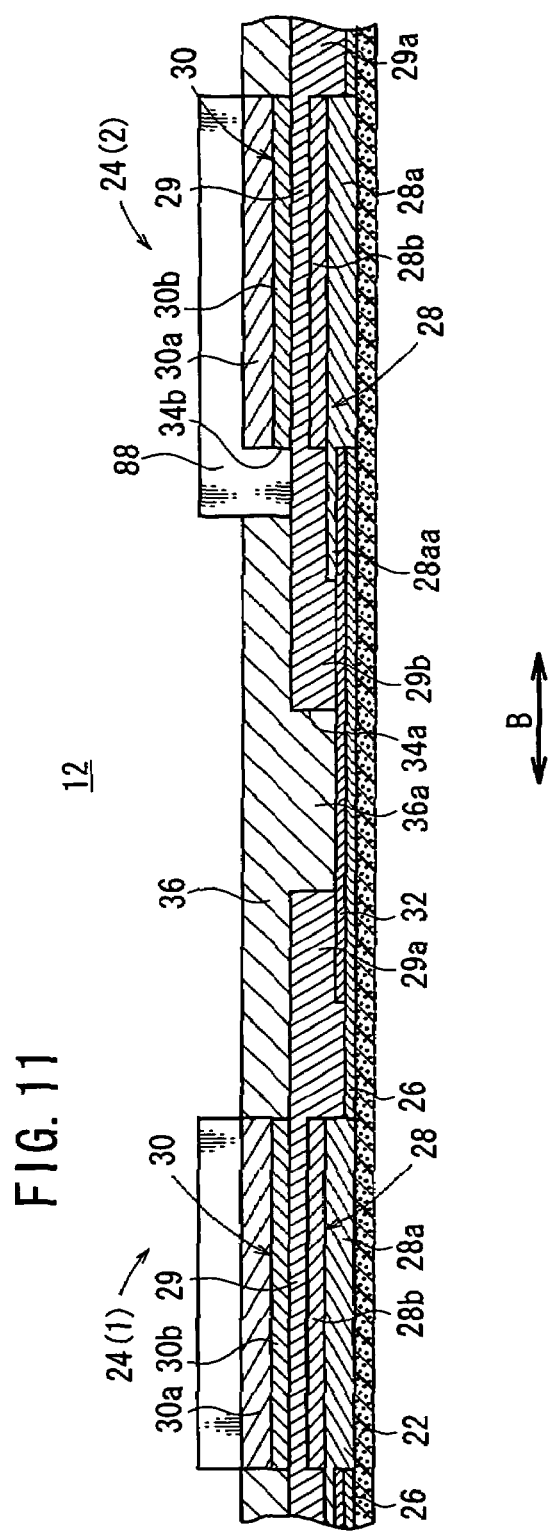
FIG. 11 is a view showing a process of forming an electrically conductive member of the fuel cell.

Thereafter, as shown in FIG. 11, the electrically conductive member 36 is formed using the masking member 88, and the electrically conductive member 36 is dried. The electrically conductive member 36 is electrically connected to the cathode diffusion layer 30a of the cathode 30 of the membrane electrode assembly 24(1). The columnar expansion 36a of the electrically conductive member 36 is inserted into the circular gap 34a formed between the ends 29a, 29b of the polymer electrolyte membrane 29. The expansion 36a is electrically connected to the metal film 32. In this manner, the cathode 30 of the membrane electrode assembly 24(1) and the anode 28 of the membrane electrode assembly 24(2) are electrically connected through the electrically conductive member 36 and the metal film 32.

Figure 12:
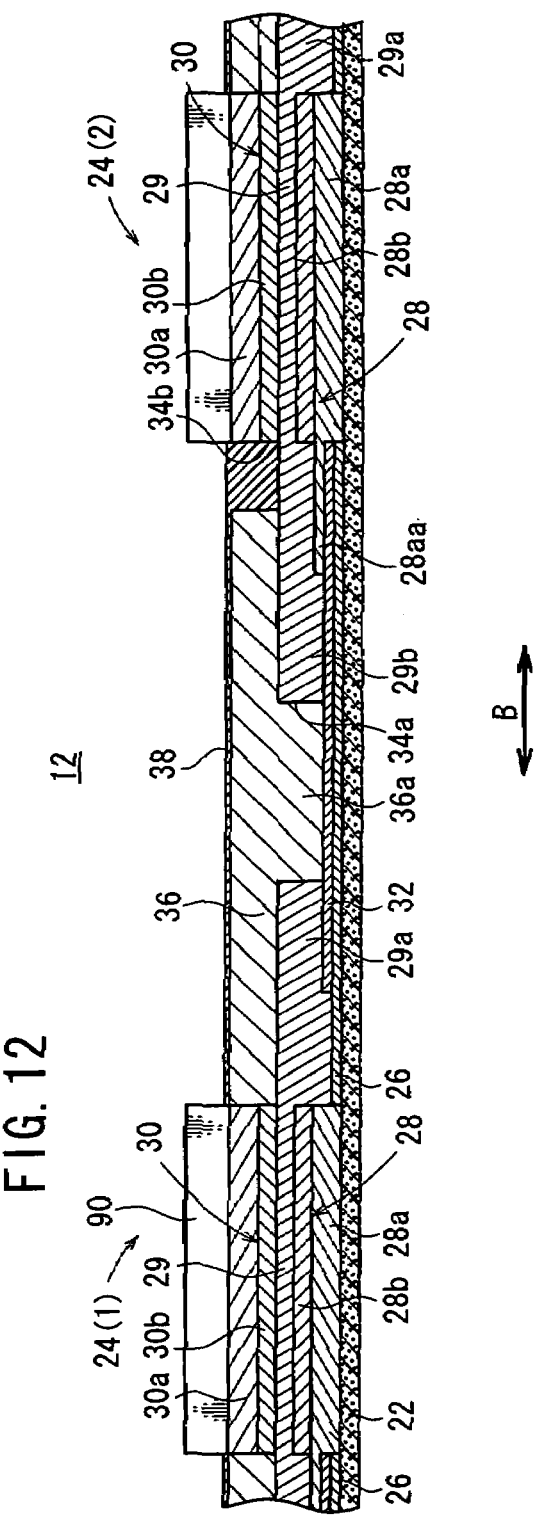
FIG. 12 is a view showing a process of forming a resin insulator in the fuel cell.

After the electrically conductive member 36 is dried, as shown in FIG. 12, the resin insulator 38 is formed using the masking member 90. The resin insulator 38 is filled in the gap 34b between the electrically conductive member 36 and the cathode 30 of the membrane electrode assembly 24(2). In this manner, the cathode 30 of the membrane electrode assembly 24(1) and the cathode 30 of the membrane electrode assembly 24(2) are insulated from each other. The pair of the adjacent membrane electrode assemblies 24(1), 24(2) are electrically connected in series on the porous resin film 22.

Figure 13:
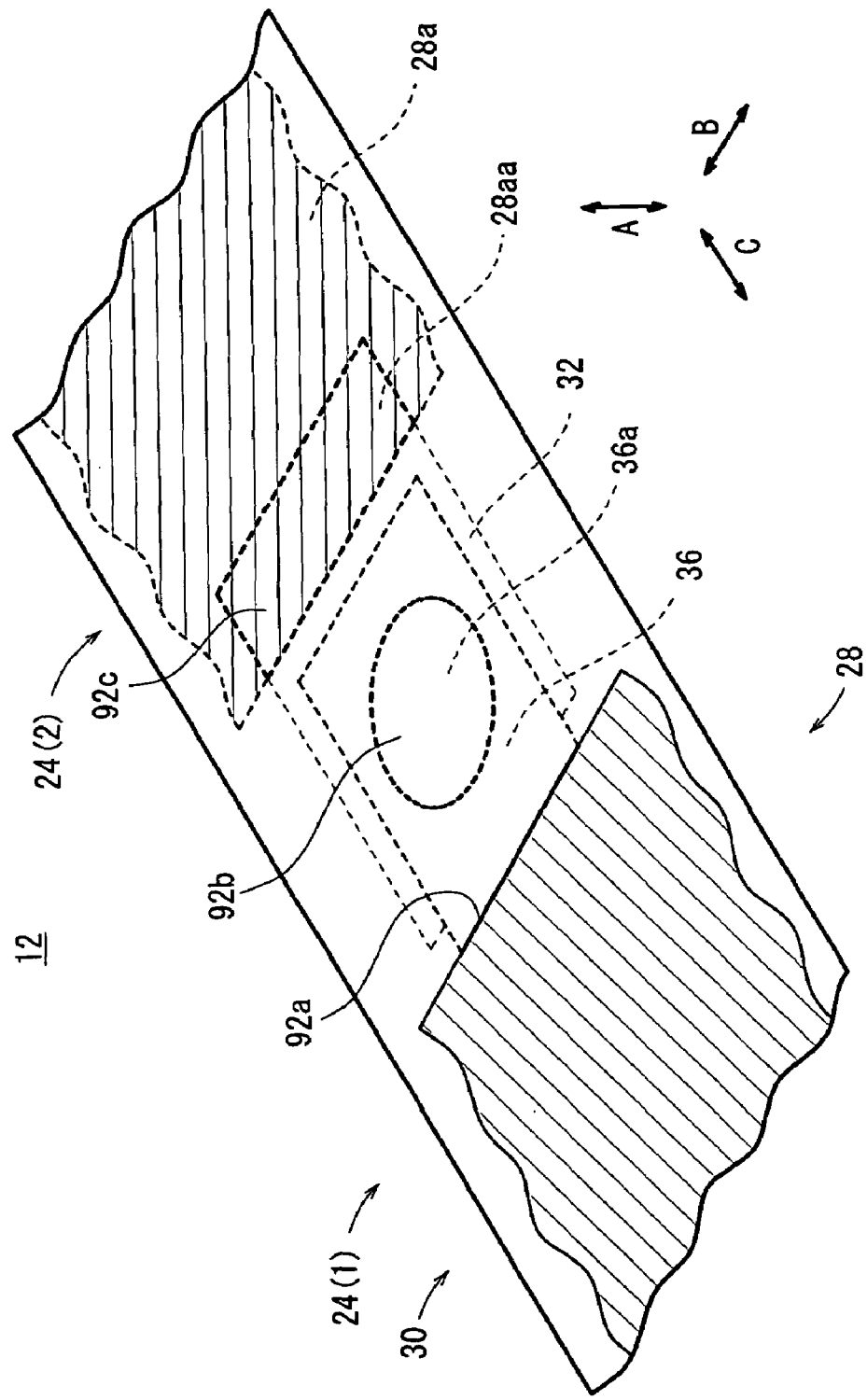
FIG. 13 is a perspective view of electrical contacts of the fuel cell.

As shown in FIG. 13, an electrical contact 92a is provided between an end of the cathode 30 of the membrane electrode assembly 24(1) and an end of the electrically conductive member 36. An electrical contact 92b is provided at an interface between an end surface of the columnar expansion 36a of the electrically conductive member 36 and the metal film 32. Further, an electrical contact 92c is provided at an interface between the metal film 32 and the end 28aa of the anode diffusion layer 28a of the membrane electrode assembly 24(2).

In the first embodiment, as shown in FIG. 3, the cathode 30 of the membrane electrode assembly 24(1) and the anode 28 of the membrane electrode assembly 24(2) are electrically connected in series by the metal film 32 and the electrically conductive member 36. Thus, unlike the conventional structure, no dedicated Z-like connection plates are required for electrical connection. The electrical connection between the electrodes can be carried out with the simple and economical structure. The overall size of the fuel cell 10 is small, and the overall structure of the fuel cell 10 is simple.

The metal film 32 can be handled easily at the time of producing the fuel cell 10. Since high accuracy is not required in positioning the electrically conductive member 36, the fuel cell 10 of the simple and small structure can be produced easily, and simply. In particular, the metal film 32 and the electrically conductive member 36 are positioned substantially in the same plane as the anode 28 and the cathode 30. The MEA unit 12 is thin, and the overall size of the fuel cell 10 is small.

In the sealing structure for preventing leakage of the fuel gas and the oxygen-containing gas, the interface having the distance of H1 (the interface between the end 29a of the polymer electrolyte membrane 29, and the silicon film 26 and the metal film 32) and the interface having the distance H2 (the interface between the end 29b of the polymer electrolyte membrane 29, and the metal film 32 and the end 28aa of the anode diffusion layer 28a) are sealed effectively. Thus, the reliability of the sealing structure for preventing leakage of the reactant gases is high.

In the first embodiment, components of the MEA unit 12 are formed on the porous resin film 22 successively. Thus, the production of the fuel cell 10 is carried out simply. The porous resin film 22 is used as a base planar surface for producing the fuel cell 10. Therefore, the membrane electrode assemblies 24(1) through 24(n) are positioned accurately, and the production of the fuel cell 10 is carried out simply.

Next, operation of the fuel cell 10 will be described.

Firstly, referring to FIG. 1, an oxygen-containing gas is supplied to the oxygen-containing gas supply passage 20a and a fuel gas such as a hydrogen containing gas is supplied to the fuel gas supply passage 18a. Further, a coolant such as pure water, an ethylene glycol or an oil is supplied to the guide grooves 72.

Specifically, as shown in FIG. 6, the oxygen-containing gas flows into the supply manifold 54 on the surface 16a of the second separator 16. Then, the oxygen-containing gas is supplied into the oxygen-containing gas flow field 58. The oxygen-containing gas flows through the flow grooves of the oxygen-containing gas flow field 58 in the direction indicated by the arrow C along the cathodes 30 of the membrane electrode assemblies 24(1) through 24(n) for inducing a chemical reaction at the cathodes 30. After the oxygen in the oxygen-containing gas is partially consumed, the oxygen-containing gas is discharged into the oxygen-containing gas discharge passage 20b through the discharge manifold 56.

Likewise, as shown in FIG. 5, the fuel gas flows into the fuel gas manifold 40 on the surface 14a of the first separator 14. Then, the fuel gas is supplied into the fuel gas flow field 44 connected to the supply manifold 40. The fuel gas flows through the flow grooves of the fuel gas flow field 44 in the direction indicated by the arrow C along the anodes 28 of the membrane electrode assemblies 24(1) through 24(n) for inducing a chemical reaction at the anodes 28.

Thus, in the membrane electrode assemblies 24(1) through 24(n), the oxygen-containing gas supplied to the cathodes 30, and the fuel gas supplied to the anodes 28 are consumed in the electrochemical reactions at catalyst layers of the cathodes 30 and the anodes 28 for generating electricity. All of the power generation units, i.e., the membrane electrode assemblies 24(1) through 24(n) are electrically connected in series between the terminals 52 and 66 for outputting a desired level of voltage.

Figure 14:
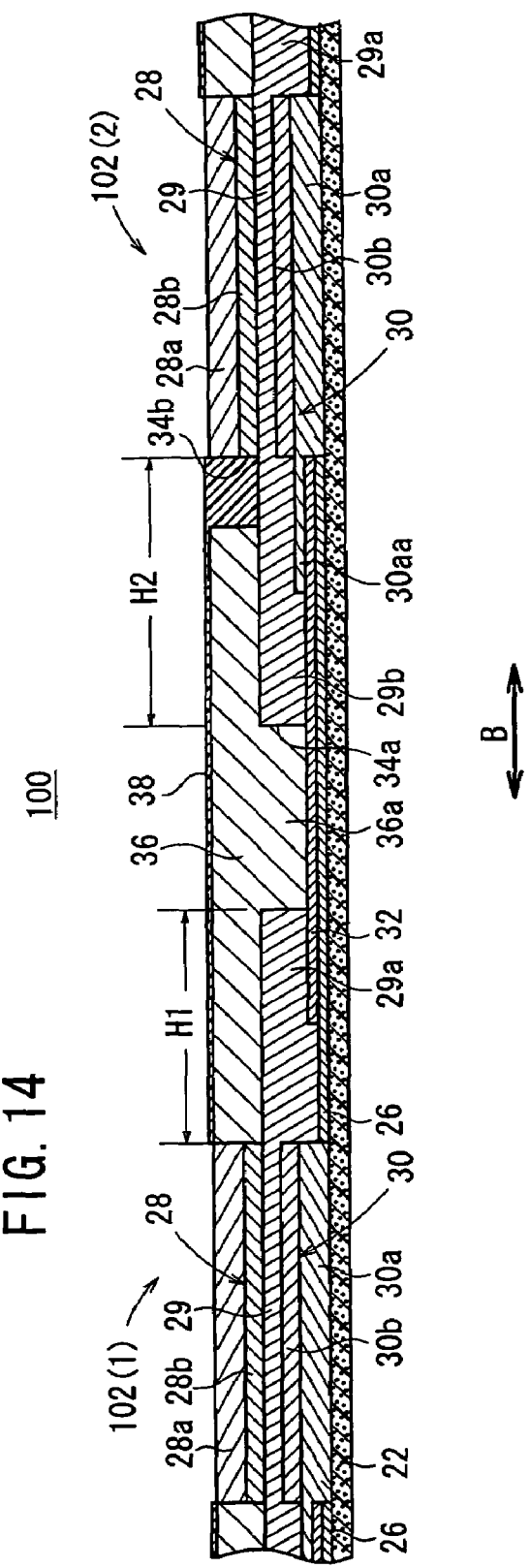
FIG. 14 a view showing connection state in an MEA unit of a fuel cell according to a second embodiment of the present invention.

FIG. 14 is a view showing connection state in an MEA unit 100 of a fuel cell according to a second embodiment of the present invention. The constituent elements that are identical to those of the MEA unit 12 of the fuel cell 10 according to the first embodiment are labeled with the same reference numeral, and description thereof will be omitted. Likewise, in the third embodiment as described later, the constituent elements that are identical to those of the MEA unit 12 of the fuel cell 10 according to the first embodiment are labeled with the same reference numeral, and description thereof will be omitted.

The membrane electrode assembly 102(1) of the MEA unit 100 includes a cathode 30 formed on a porous resin film 22, and an anode 28, and a polymer electrolyte membrane 29 interposed between the cathode 30 and the anode 28.

The membrane electrode assembly 102(2) adjacent to the membrane electrode assembly 102(1) has an end 30aa extending from the cathode diffusion layer 30a toward the membrane electrode assembly 102(1), and the end 30aa is stacked on the metal film (second electrically conductive film) 32. An end of the electrically conductive member (first electrically conductive film) 36 is electrically connected to the anode diffusion layer 28a of the anode 28 of the membrane electrode assembly 102(1).

In the second embodiment, the cathode 30 is disposed on the lower side, and the anode 28 is disposed on the upper side, on the porous resin film 22, i.e., the cathode 30 and the anode 28 are disposed upside-down in contrast to the first embodiment. The advantages of the first embodiment can be obtained in the second embodiment.

Figure 15:
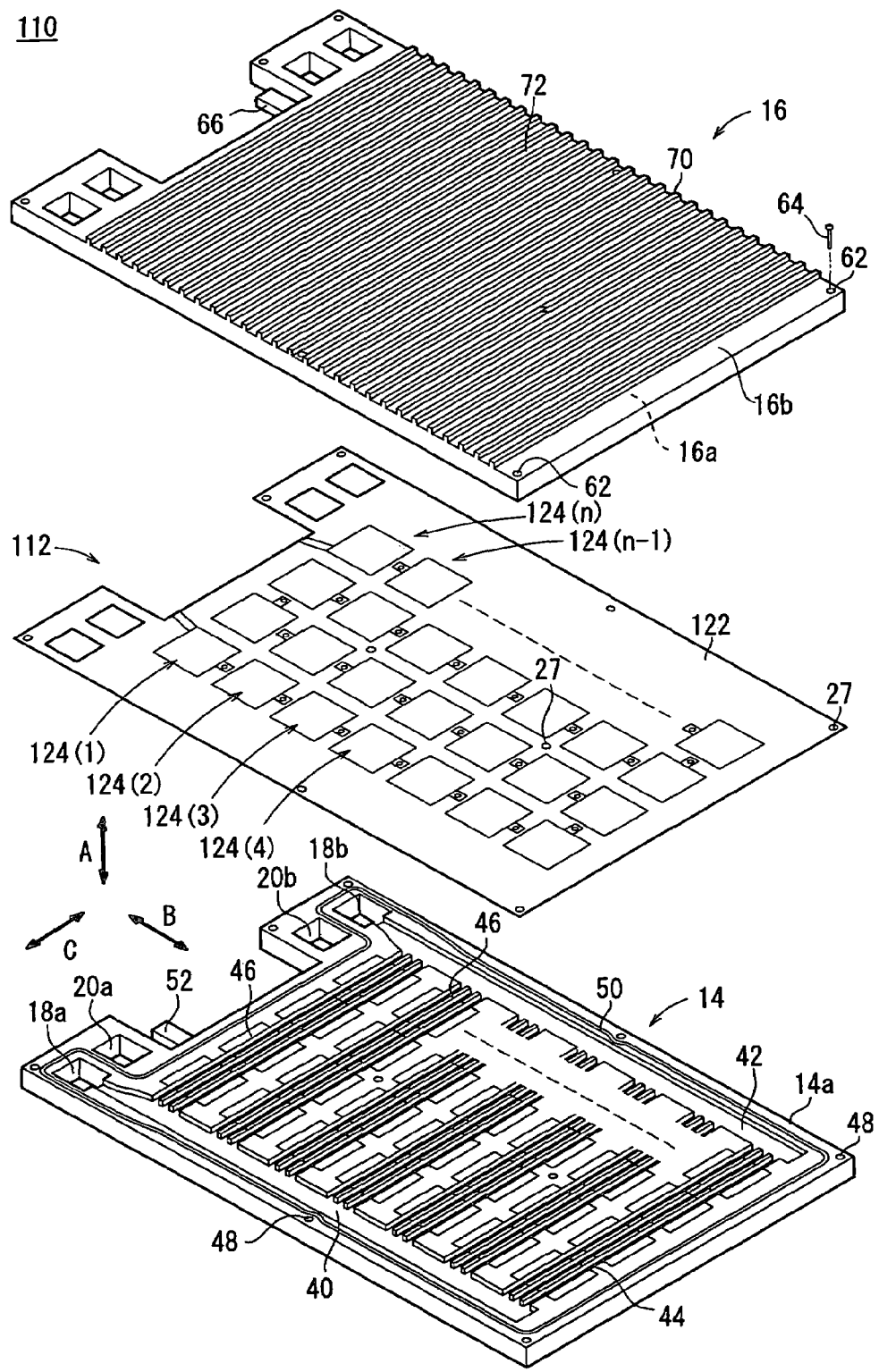
FIG. 15 is an exploded perspective view showing main components of the fuel cell according to a third embodiment of the present invention.
Figure 16:
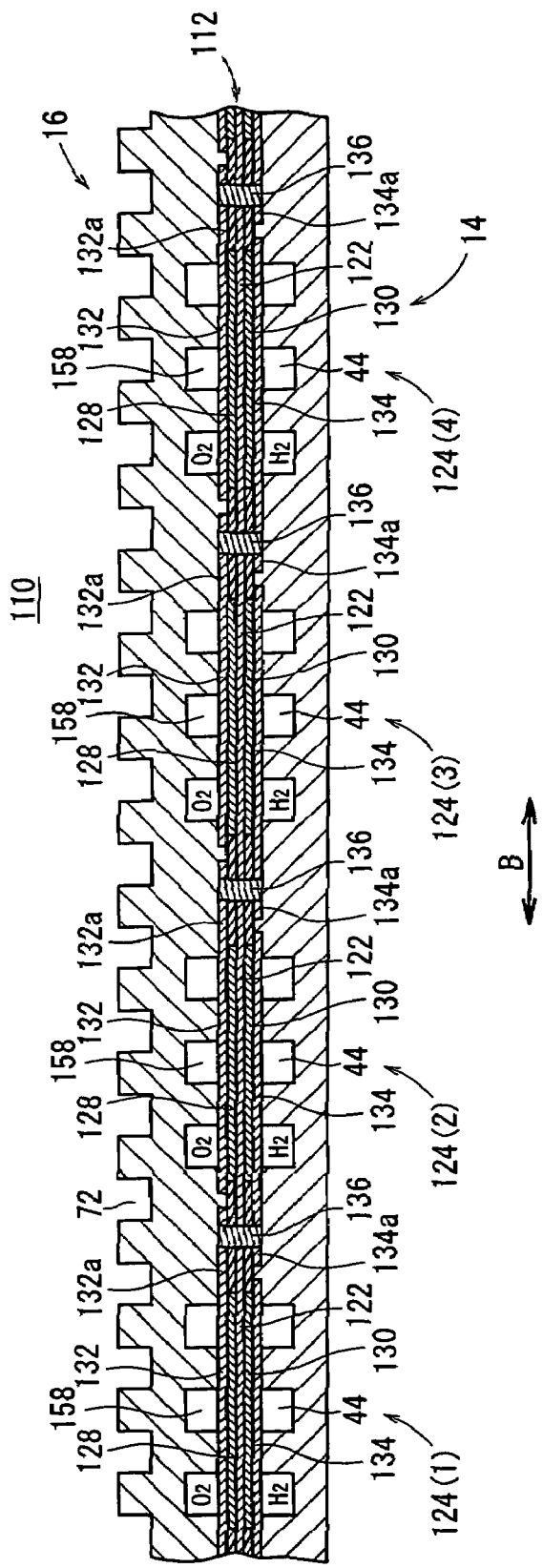
FIG. 16 is a cross sectional view showing main components of the fuel cell.

FIG. 15 is an exploded perspective view showing main components of the fuel cell 110 according to the third embodiment of the present invention, and FIG. 16 is a cross sectional view showing main components of the fuel cell 110.

The fuel cell 110 includes an MEA unit 112, and first and second separators 14, 16 for sandwiching the MEA unit 112.

The MEA unit 112 includes a solid polymer electrolyte membrane 122 formed by impregnating a thin membrane of perfluorosulfonic acid with water, for example. The solid polymer electrolyte membrane 122 is a common electrolyte for making up a plurality of membrane electrode assemblies (power generation units) 124(1) through 124(n).

Figure 17:
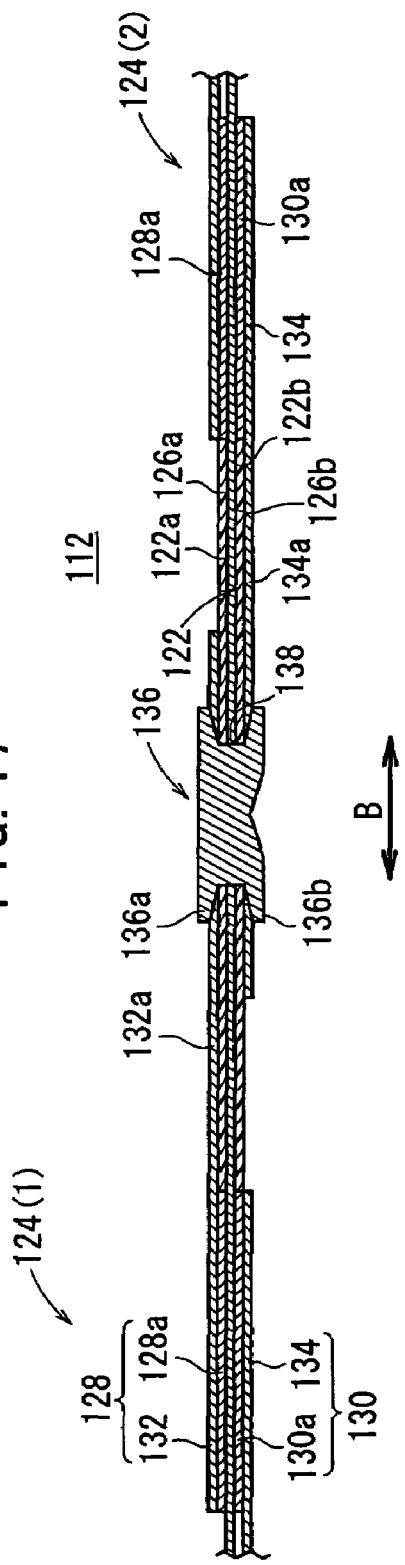
FIG. 17 is a view showing connection state in an MEA unit of the fuel cell.

As shown in FIG. 17, reinforcing films (e.g., silicon films) 126a, 126b are formed on both surfaces 122a, 122b of the solid polymer electrolyte membrane 122 around portions for providing the electrodes as described later.

The membrane electrode assembly 124(1) includes a cathode 128 on one surface 122a of the solid polymer electrolyte membrane 122, and an anode 130 on the other surface 122b of the solid polymer electrolyte membrane 122. Each of the anode 130 and the cathode 128 is formed by coating the surface 122a, 122b with porous carbon particles which support platinum alloy. The cathode 128 includes cathode catalyst layer 128a and a first electrically conductive diffusion layer 132, and the anode 130 includes an anode catalyst layer 130a and a second electrically conductive diffusion layer 134.

The membrane electrode assemblies 124(2) through 124(n) have the same structure as the membrane electrode assembly 124(1). The constituent elements that are identical to those of the membrane electrode assembly 124(1) are labeled with the same reference numeral, and description thereof will be omitted.

Figure 18:
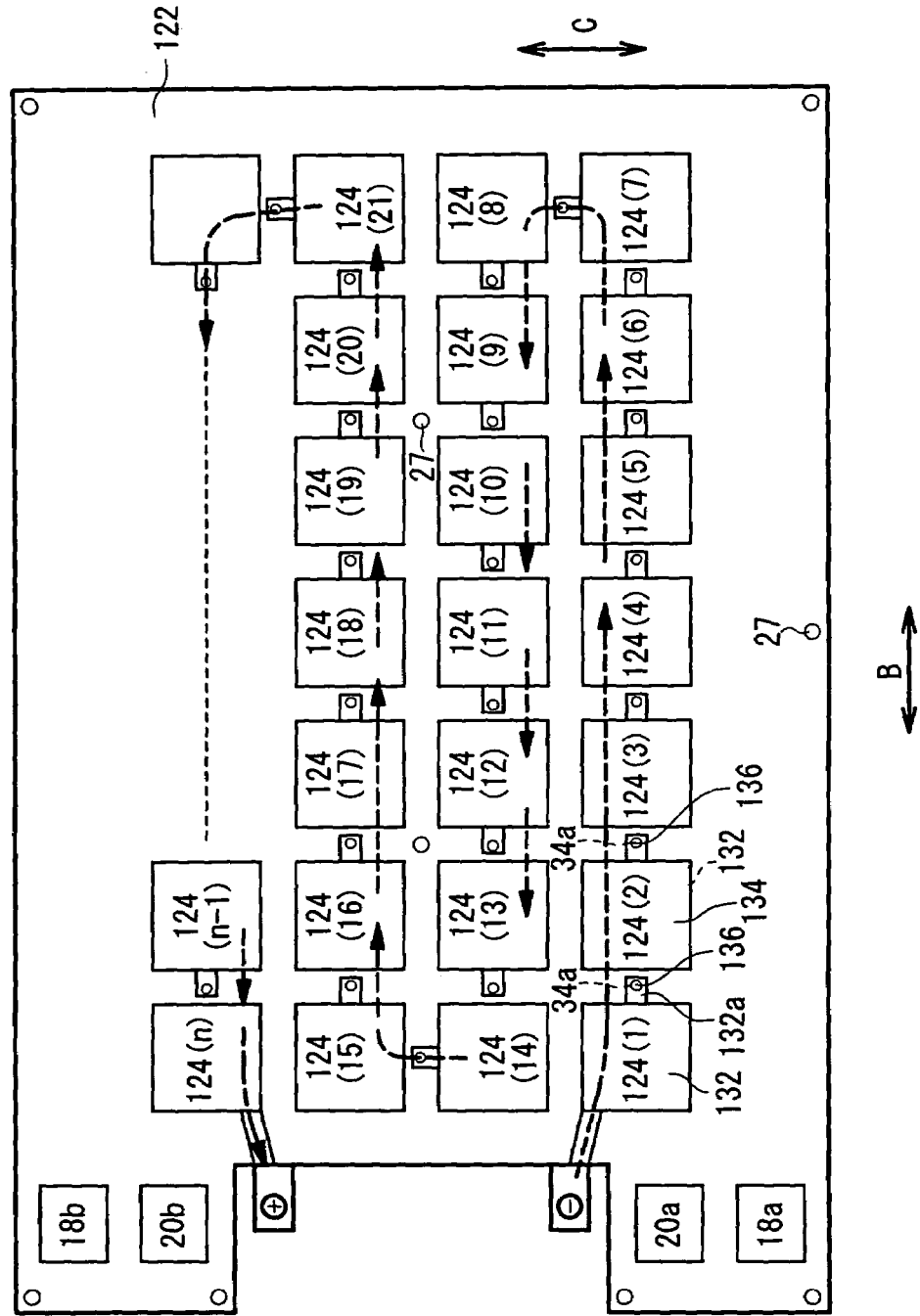
FIG. 18 is a front view showing the MEA unit.

As shown in FIGS. 17 and 18, the first electrically conductive diffusion layer 132 of the membrane electrode assembly 124(1) has a first end 132a extending toward the adjacent membrane electrode assembly 124(2). The second electrically conductive diffusion layer 134 of the membrane electrode assembly 124(2) has a second 134a end extending toward the adjacent membrane electrode assembly 124(1).

The first and second ends 132a, 134a partially overlap such that the solid polymer electrolyte membrane 122 and the silicon films 126a, 126b are interposed between overlapping portions of the first and second ends 132a, 134a. The overlapping portions are electrically connected with each other by an electrically conductive rivet member 136. A seal member 138 is formed around the outer surface of the rivet member 136 for sealing both surfaces of the solid polymer electrolyte membrane 122 hermetically. Flanges 136a, 136b protruding toward the first end 132a and the second end 134a are formed by squeezing the rivet member 136.

As shown in FIGS. 16 and 18, the first electrically conductive layer 132 of the membrane electrode assembly 124(2) has a first end 132a extending toward the adjacent membrane electrode assembly 124(3). The second electrically conductive diffusion layer 134 of the membrane electrode assembly 124(3) has a second end 134a extending toward the adjacent membrane electrode assembly 124(2). The overlapping portions of the first and second ends 132a, 134a are electrically connected by the rivet member 136. Likewise, the membrane electrode assemblies 124(3) through 124(n) are electrically connected in series.

Next, operation of producing the fuel cell 110 will be described.

Firstly, the silicon films 126a, 126b are attached to both surfaces 122a, 122b of the solid polymer electrolyte membrane 122. The silicon films 126a, 126b have cutouts corresponding to the shapes of the membrane electrode assemblies 124(1) through 124(n). Other films such as thin polyimide films may be used instead of the silicon films 126a, 126b.

Next, a cathode electrolyte layer is formed on the surface 122a of the solid polymer electrolyte membrane 122 by coating, and an anode electrolyte layer is formed on the surface 122b of the solid polymer electrolyte membrane 122.

Thus, the solid polymer electrolyte membrane 122 is interposed between the cathode 128, and the anode 130. A predetermined number of membrane electrode assemblies 124(1) through 124(n) are used for forming the MEA unit 112.

The first electrically conductive diffusion layer 132 and the second electrically conductive diffusion layer 134 are provided on both surfaces of the MEA unit 112, corresponding to the membrane electrode assemblies 124 (1) through 124(n). As shown in FIG. 17, the first end 132a of the first electrically conductive layers 132 and the second end 134a of the second electrically conductive layer 134 are overlapped with each other such that the solid polymer electrolyte membrane 122 is interposed between the first and second ends 132a, 134a. The rivet member 136 is inserted in the overlapping area.

The seal member 138 such as a silicon rubber is provided around the outer surface of the rivet member 136 for sealing the hole in the overlapping area to prevent leakage of the fuel gas and the oxygen-containing gas. The rivet member 136 is squeezed to form the flanges 136a, 136b which are tightly in contact with the first and second ends 132a, 134a. Thus, the cathode 128 of the membrane electrode assembly 124(1) and the anode 130 of the membrane electrode assembly 124(2) are electrically connected. Likewise, all of the membrane electrode assemblies 124(1) through 124(n) are electrically connected in series (see arrows in FIG. 18).

In the third embodiment, the first end 132a of the first electrically conductive layer 132 of the first membrane electrode assembly 124(1) and the second end 134a of the second electrically conductive layer 134 of the second membrane electrode assembly 124(2) extend toward each other. The first end 132a and the second end 134a overlap such that the solid polymer electrolyte membrane 122 and the silicon films 126a, 126b are interposed between the first end 132a and the second end 134a. The rivet member 136 is inserted into the overlapping area to electrically connect the overlapping first end 132a and the 134a, i.e., the cathode 128 of the membrane electrode assembly 124(1) and the anode 130 of the membrane electrode assembly 124(2).

Thus, unlike the conventional structure, no dedicated Z-like connection plates are required. In particular, even if a large number of membrane electrode assemblies 124(1) through 124(n) are provided, the fuel cell 110 is produced at a low cost, and the reliable sealing performance can be achieved. The overall size of the fuel cell 110 is small, and the overall structure of the fuel cell 110 is simple.

After the MEA unit 112 is interposed between the first and second separators 14, 16, through holes extending through the MEA unit 112, and the first and second separators 14, 16 are formed. The through holes are shown as the threaded holes 48 of the first separator 14, the holes 27 of the MEA unit 112, and the holes 62 of the second separator 16. Since the MEA unit 112 keeps the planar shape when the MEA unit 112 is interposed between the first and second separators 14, 16, the perforating operation for making the through holes at predetermined positions can be carried out accurately.

For example, the through holes (the holes 62 and the threaded holes 48) are sealed using a silicon rubber or the like for improving the sealing performance.

Tightening screws 64 are inserted into the holes 62, and tip ends of the tightening screws 64 are screwed into the threaded holes 48, respectively. In this manner, the first separator 14, the MEA unit 112, and the second separator 16 are tightened together to form the fuel cell 110.

Figure 19:
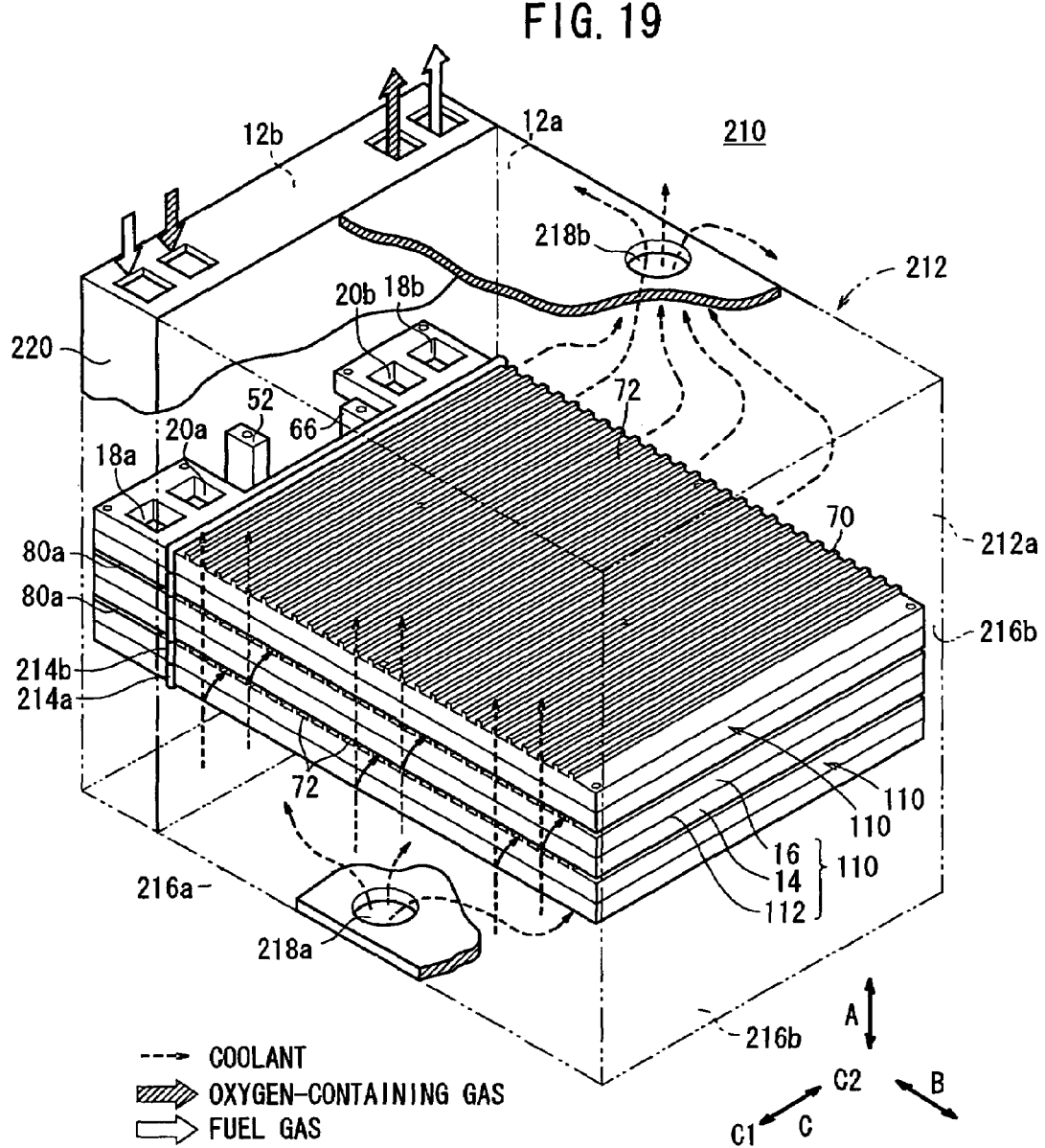
FIG. 19 is a perspective view schematically showing a fuel cell stack according to a fourth embodiment of the present invention.

FIG. 19 is a perspective view schematically showing the fuel cell stack 210 according to the fourth embodiment of the present invention. The constituent elements that are identical to those of the fuel cell stack 110 according to the third embodiment are labeled with the same reference numeral, and description thereof will be omitted.

The fuel cell stack 210 includes a casing 212, and a plurality of fuel cells 110 provided in the casing 212. The fuel cells 110 are stacked in the direction indicated by an arrow A.

Figure 20:
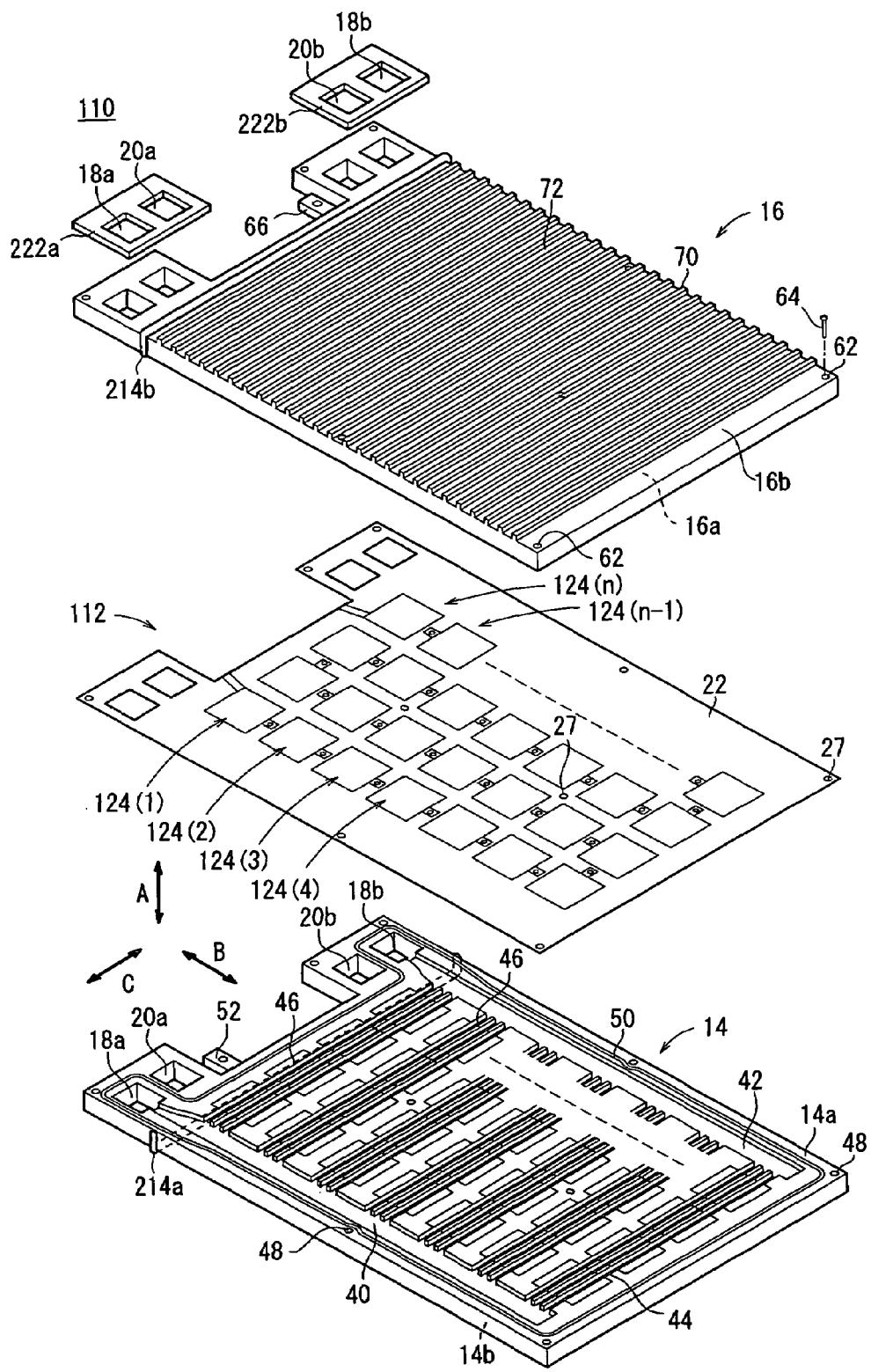
FIG. 20 is an exploded perspective view showing main components of a fuel cell of the fuel cell stack.

As shown in FIG. 20, a seal member 214a is attached to the first separator 14. The seal member 214a extends along the entire width in the direction indicated by the arrow C on the surface 14b opposite to the surface 14a, and extends along both side surfaces of the first separator 14. The seal member 214a is provided adjacent to the fuel gas supply passage 18a, the oxygen-containing gas supply passage 20a, the oxygen-containing gas discharge passage 20b, and the fuel gas discharge passage 18b for preventing leakage from the coolant passage as described later.

A seal member 214b is attached to the second separator 16. The seal member 214b is provided adjacent to the fuel gas supply passage 18a, the oxygen-containing gas supply passage 20a, the oxygen-containing gas discharge passage 20b, and the fuel gas discharge passage 18b. The seal member 214b extends along the entire width in the direction indicated by the arrow C on the surface 16b, and along both side surfaces of the second separator 16. When the first and second separators 14, 16 are stacked together, the seal members 214a, 214b jointly forms seal structure wound around the fuel cell 110.

The casing 212 is made of resin, and has aluminum outer plates. As shown in FIG. 19, a stack of the fuel cells 110 are provided in a chamber 212a. Further, a coolant supply passage 216a and a coolant supply passage 216b connected to guide grooves 72 of the fuel cells 110 are provided in the chamber 212a.

Figure 21:
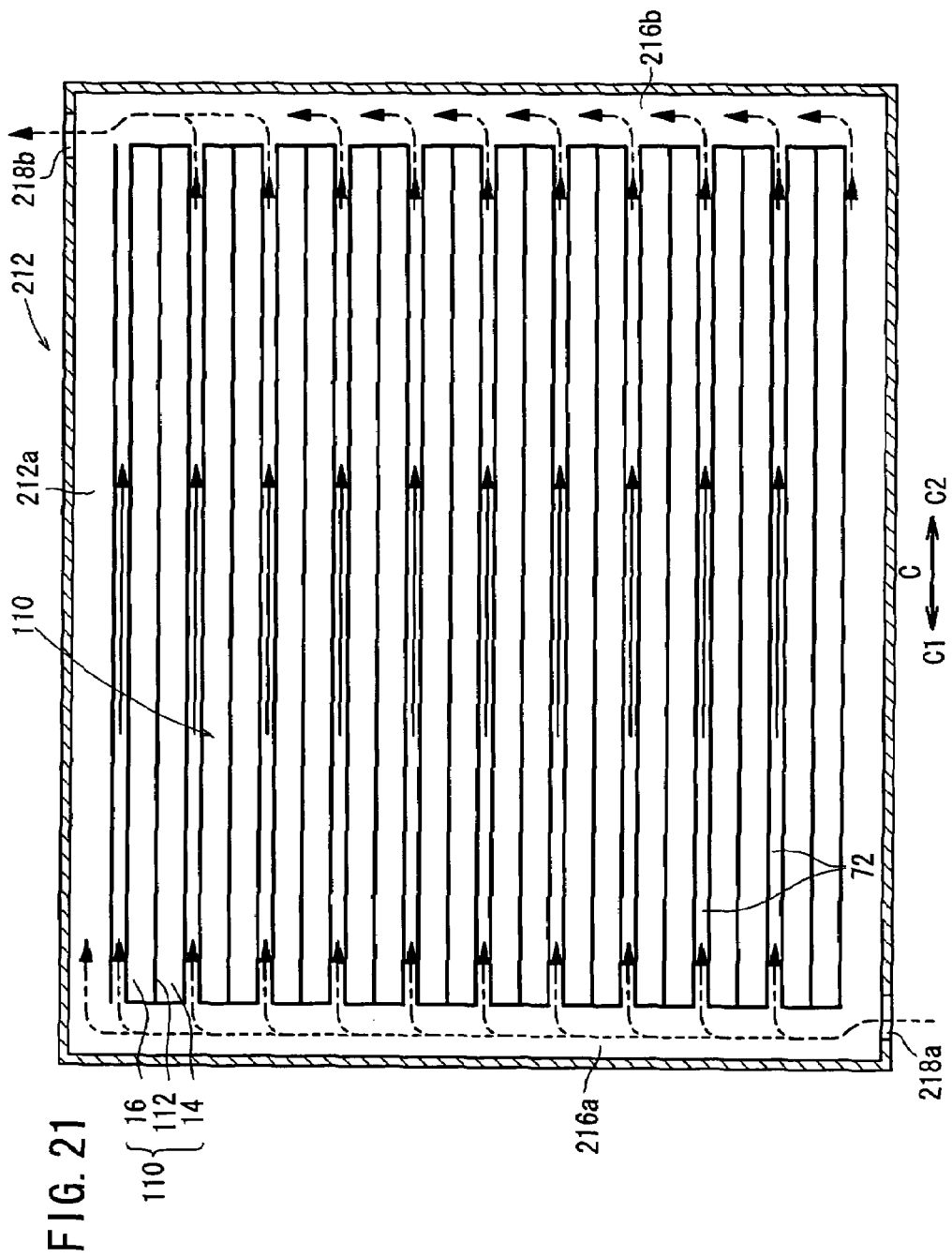
FIG. 21 is a view showing a coolant supply passage and a coolant discharge passage of the fuel cell stack.

As shown in FIGS. 19 and 21, the coolant supply passage 216a is formed between an inner wall of the casing 212 and end surfaces of the fuel cells 110 in a direction indicated by the arrow C1 and the coolant discharge passage 216b is formed between the inner surface of the casing 212 and end surfaces of the fuel cells 110 in the other direction indicated by the arrow C2. A coolant inlet 218a is formed at a bottom surface of the casing 212. The coolant inlet 218a is connected to an end of the coolant supply passage 216a at one end in the direction indicated by the arrow C1. A coolant outlet 218b is formed at a top surface of the casing 212. The coolant outlet 218b is connected to the coolant discharge passage 216 at the other end in the direction indicated by the arrow C2.

As shown in FIG. 19, the fuel cells 110 are stacked in the direction indicated by the arrow A. Thus, the seal members 214a, 214b of the fuel cells 110 are stacked together, and the interior of the chamber 212 is separated into the chamber 212a and the reactant gas chamber 212b. A casing cover 220 covers the reactant gas chamber 212b.

Figure 22:
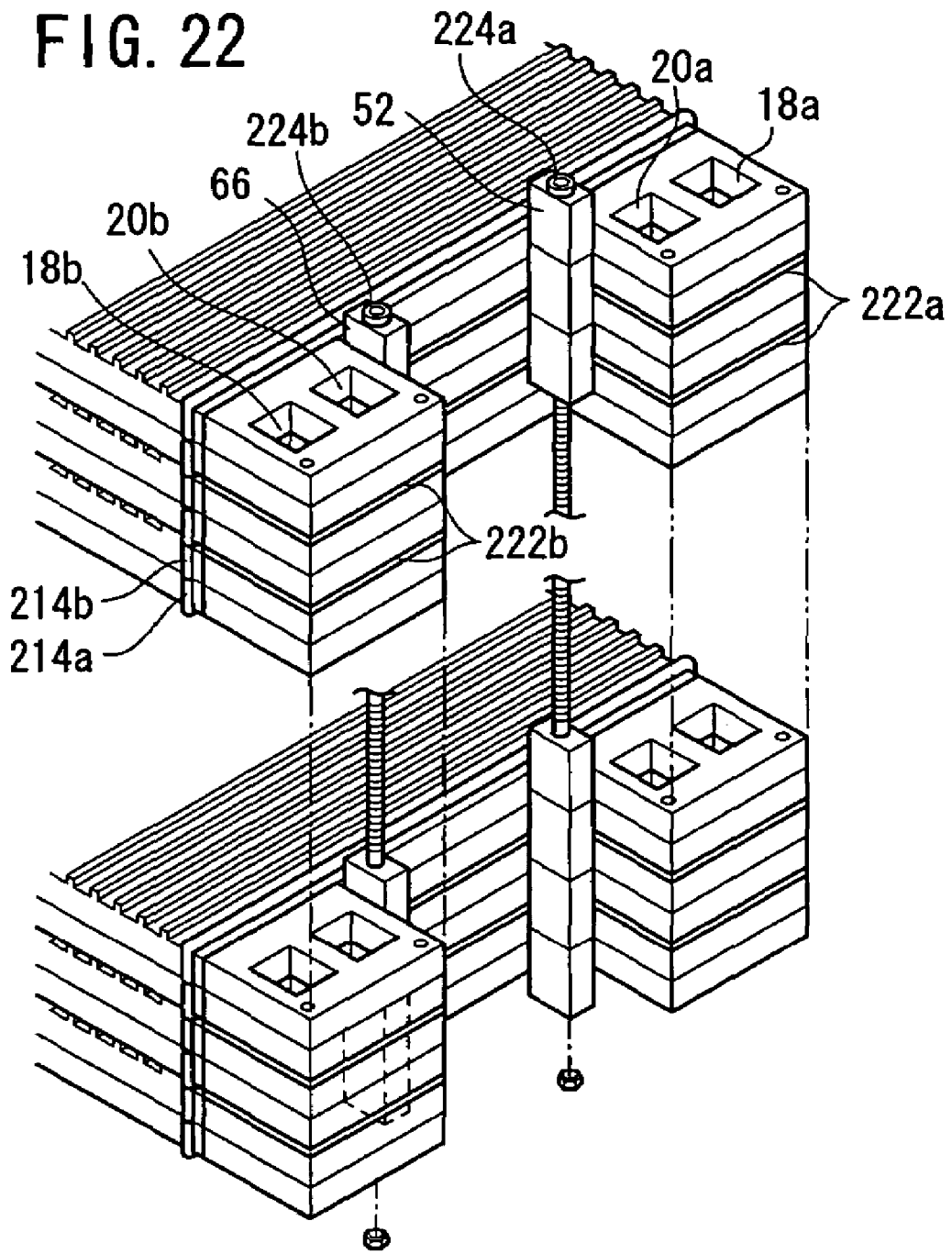
FIG. 22 is a perspective view showing a part of the fuel cell stack.
Figure 23:
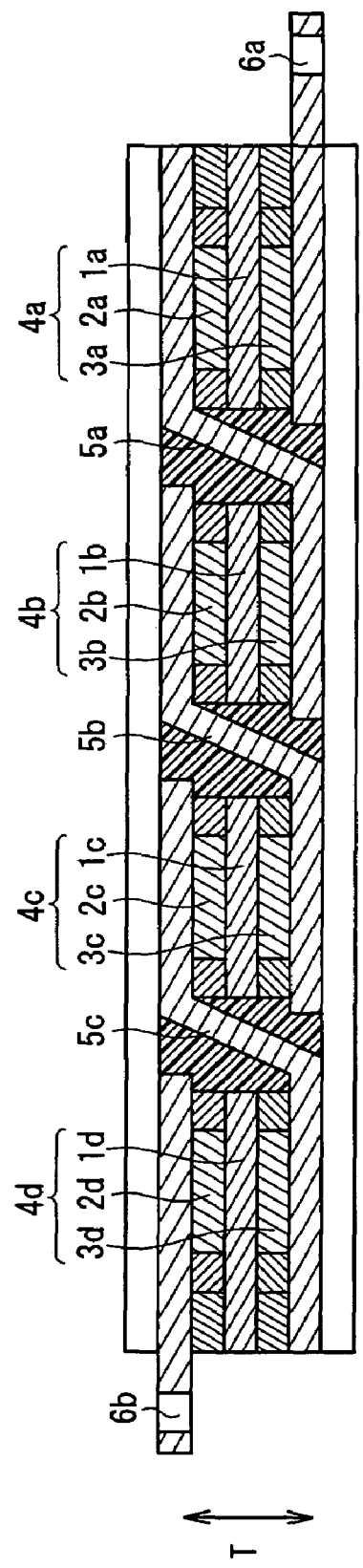
FIG. 23 is a cross sectional view showing main components of a conventional flat fuel cell.

As shown in FIG. 22, spacers 222a, 222b for connecting gas passages are formed between the fuel cells 110. The spacer 222a has the fuel gas supply passage 18a and the oxygen-containing gas supply passage 20a, and the spacer 222b has the oxygen-containing gas discharge passage 20b and the fuel gas discharge passage 18b (see FIG. 20).

Terminals 52 of the fuel cells 110 are connected together tightly by a terminal tightening bolt 224a. Terminals 66 of the fuel cells 110 are connected together tightly by a terminal tightening bolt 224b (see FIG. 22).

Next, operation of producing the fuel cell stack 210 will be described.

Firstly, as shown in FIG. 20, tightening screws 64 are inserted into the holes 62 when the MEA unit 112 is interposed between the first and second separators 14, 16. The ends of the tightening screws 64 are screwed into the threaded holes 48. Thus, the first separator 14, the MEA unit 112, and the second separator 16 are tightened together to form one fuel cell 110. The fuel cells 110 are stacked in the direction indicated by the arrow A, and the spacers 222a, 222b are interposed between the fuel cells 110. After a predetermine number of the fuel cells 110 are stacked together, the terminal bolts 224a, 224b are inserted into the terminals 52, 66 for tightening the terminals 52, 66 together (see FIG. 22). As shown in FIG. 19, the stack of the fuel cells 110 is disposed in the casing 212 such that the seal members 214a, 214b of the fuel cells 110 are tightly in contact with each other. The chamber 212a and the reactant gas chamber 212b are separated in the casing 212.

The stack of the fuel cells 110 is disposed in the chamber 212a. The coolant inlet 218a is connected to the coolant supply passage 216a, and the coolant outlet 218b is connected to the coolant discharge passage 216b. The coolant supply passage 216a and the coolant discharge passage 216b are connected to the guide grooves 72 of the fuel cells 110.

In the fourth embodiment, each of the fuel cells 110 includes the MEA unit 112, and the first and second separators 14, 16 sandwiching the MEA unit 112. The first and second separators 14, 16 are electrically insulating separators 14, 16. In contrast to the metal separators, the first and second insulating separators 14, 16 are produced easily at a low cost.

The second separator 16 has the guide grooves 72 as passages of the coolant. The guide grooves 72 are electrically insulated desirably. Since the guide grooves are insulated, leakage of electricity to the liquid or the ground is reliably prevented. Consequently, special coolant for the fuel cell or dedicated devices such as an ion exchanger for preventing the leakage of the electricity to the liquid are not required. The cooling system is simple, and produced or operated at a low cost.

It is not required to use alcohol or like which does not freeze easily. The oxidation of the solid polymer electrolyte membrane 122 is prevented, and elusion of ions can be prevented without any special devices.

The guide grooves 72 are formed along the surface of the second separator 16 to increase the surface area of the second separator 16, and thus, to improve the cooling efficiency. The first separator 14 of one fuel cell 110 is in contact with the second separator 16 of the adjacent fuel cell 110, and the guide grooves 72 for supplying the coolant are formed between the first and second separators 14, 16. When an impact such as vibration is applied to the casing 212, since the first and second separators 14, 16, are in contact with each other, the first and second separators 14, 16 do not rattle, and the fuel cells 110 is not damaged easily by the impact.

In the fourth embodiment, a predetermined number of the fuel cells 110 are stacked in the casing 212. The coolant supply passage 216a or the coolant discharge passage 216b is formed between the end surfaces of the fuel cells 110 and the inner surface of the casing 212. Thus, it is not necessary to provide dedicated cooling structure in each of the fuel cells 110, and it is not necessary to place each of the fuel cells 110 in a dedicated container. The number of components of the fuel cell stack 210 is small. The fuel cell 110 is simple, and small. The fuel cells 110 can be replaced individually, and handled with ease.

According to the fuel cell of the present invention, unlike the conventional structure, no dedicated Z-like connection plates are required. The reliable sealing performance can be achieved with the simple and economical structure. The overall size of the fuel cell is small, and the overall structure of the fuel cell is simple.

According to the method of producing the fuel cell of the present invention, components of the fuel cells are formed successively on the porous resin film. Thus, the production of the fuel cell is carried out simply. The porous resin film is used as a base surface for producing the fuel cell. Therefore, the power generation units are positioned accurately. Since the interfaces over the base surface are sealed, it is not required to provide seals which extend through the fuel cell in the stacking direction. The desired sealing performance can be achieved reliably.

According to the fuel cell stack of the present invention, the electrically insulating separator has the guide grooves as passage of the coolant. The guide grooves are electrically insulated desirably. Since the guide grooves are insulated, leakage of electricity to the liquid or the ground is reliably prevented. Consequently, special coolant for the fuel cell or dedicated devices for preventing the leakage of the electricity to the liquid such as an ion exchanger are not required. The cooling system is simple, and produced or operated at a low cost. No periodical maintenance operations are required.

It is not required to use alcohol or like which does not freeze easily. The oxidation of the solid polymer electrolyte membrane is prevented, and elusion of ions form system components can be prevented without any special devices.

The guide grooves are formed along the surface of the second separator to increase the surface area of the second separator, and thus, to improve the cooling efficiency. It is not necessary to provide dedicated cooling structure in each of the fuel cells, and it is not necessary to place each of the fuel cells in a dedicated container. The number of components of the fuel cell stack is small. Therefore, the fuel cell is simple, and small. The fuel cells can be replaced individually, and handled with ease.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising:
a porous insulating film;
a plurality of power generation units positioned on top of the porous insulating film, the plurality of power generation units including a pair of adjacent power generation units, said power generation units each including a first electrode facing said porous insulating film, a second electrode, and an electrolyte interposed between said first electrode and said second electrode, wherein a film having windows is laminated on said porous insulating film such that at least one of said first and second electrodes of said power generation units are disposed in said windows;
a first electrically conductive film that is disposed between said pair of adjacent power generation units and is not stacked on either of said adjacent power generation units, said first electrically conductive film being electrically connected to said first electrode of one of said adjacent power generation units, and extending in parallel to said first electrode; and
a second electrically conductive film that is disposed between said pair of adjacent power generation units and is not stacked on either of said adjacent power generation units, said second electrically conductive film being electrically connected to said second electrode of the other of said adjacent power generation units, and extending in parallel to said second electrode,
wherein said first electrically conductive film and said second electrically conductive film are separate and distinct from said first electrode and said second electrode,
wherein said first electrically conductive film or said second electrically conductive film has an expansion made of a same material as said first or second electrically conductive films, said expansion provided between said first electrically conductive film and said second electrically conductive film for connecting said first electrically conductive film and said second electrically conductive film, and
wherein a portion of each electrolyte of the pair of adjacent power generation units is sandwiched between the first and second electrically conductive films.

2. A fuel cell according to claim 1, wherein said first electrically conductive film is arranged in a substantially same plane with a gas diffusion layer of said first electrode, and said second electrically conductive film is arranged in a substantially same plane with a gas diffusion layer of said second electrode.

3. A fuel cell according to claim 1, wherein said first electrically conductive film is made of metal, and said second electrically conductive film is made of a composite material including a resin and an electrically conductive material.

4. A fuel cell according to claim 1, wherein said first electrically conductive film is made of a composite material including a resin and an electrically conductive material, and said second electrically conductive film is made of metal.

5. A fuel cell according to claim 1, wherein a reactant gas supply passage and a reactant gas discharge passage extend through an end of said fuel cell.

6. A fuel cell stack according to claim 1, further comprising:
   a plurality of fuel cells, said fuel cells each including said plurality of power generation units arranged in a same plane and a pair of electrically insulating separators for sandwiching said power generation units,
   a casing containing said plurality of fuel cells,
   wherein a plurality of guide grooves are formed on at least one of said separators on a surface opposite to a surface facing said power generation units, for supplying a coolant along said separator;
   a coolant passage formed in a spacing between said casing and said plurality of fuel cells so that said coolant flows along a surface of said casing, said coolant passage is connected to said guide grooves of each of said fuel cells in said casing,
   a reactant gas supply passage and a reactant gas discharge passage extend through said fuel cells in a stacking direction of said fuel cells, and
   a seal member provided on the at least one of said separators on the surface opposite to the surface facing said power generation units, where the seal member separates said reactant gas supply passage and said reactant gas discharge passage from said coolant passage.

7. A fuel cell stack according to claim 6, wherein the seal member extends along an entire width of the at least one of said separators on the surface opposite to the surface facing said power generation units, the seal member includes a bent portion that extends along a side surface of the at least one of said separators, the bent portion is interposed between said casing and said side surface of the at least one of said separators.

* * * * *